United States Patent
Hayashi

(10) Patent No.: US 9,568,743 B2
(45) Date of Patent: Feb. 14, 2017

(54) LENS HOLDER DRIVE DEVICE, CAMERA MODULE, AND PORTABLE TERMINAL PROVIDED WITH CAMERA

(71) Applicant: Ichiro Hayashi, Tokyo (JP)

(72) Inventor: Ichiro Hayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/910,496

(22) PCT Filed: Aug. 4, 2014

(86) PCT No.: PCT/JP2014/070488
§ 371 (c)(1),
(2) Date: Feb. 5, 2016

(87) PCT Pub. No.: WO2015/020000
PCT Pub. Date: Feb. 12, 2015

(65) Prior Publication Data
US 2016/0187668 A1      Jun. 30, 2016

(30) Foreign Application Priority Data

Aug. 9, 2013   (JP) ................................ 2013-166241

(51) Int. Cl.
*G02B 1/00* (2006.01)
*G02B 27/64* (2006.01)
(Continued)

(52) U.S. Cl.
CPC ............... *G02B 27/646* (2013.01); *G02B 7/09* (2013.01); *G02B 13/001* (2013.01);
(Continued)

(58) Field of Classification Search
CPC  H04N 5/232; H04N 5/23267; H04N 5/23287; H04N 5/2254; H04N 5/2257; G02B 27/646; G02B 7/09; G02B 27/0006; G02B 13/001; G02B 7/08; G03B 13/36; G03B 5/00
(Continued)

(56) References Cited

U.S. PATENT DOCUMENTS

| | | | |
|---|---|---|---|
| 2012/0154614 A1* | 6/2012 | Moriya | ................ H04N 5/2254 348/208.5 |
| 2012/0174574 A1 | 7/2012 | Kotanagi et al. | |
| 2013/0016427 A1 | 1/2013 | Sugawara | |

FOREIGN PATENT DOCUMENTS

| | | |
|---|---|---|
| JP | 2011-039485 A | 2/2011 |
| JP | 2013-024938 A | 2/2013 |

(Continued)

OTHER PUBLICATIONS

International Search Report from International Application No. PCT/JP2014/070488 mailed Nov. 4, 2014.

*Primary Examiner* — Euncha Cherry
(74) *Attorney, Agent, or Firm* — Brundidge & Stanger, P.C.

(57) ABSTRACT

A lens holder driving apparatus includes: an auto-focusing lens holder driving section (AF section) including a permanent magnet; and a camera-shake correcting section that corrects camera-shake by moving the AF section with respect to a fixed section. The camera-shake correcting section includes: a supporting member that supports the AF section in a rocking manner; and a camera-shake correction coil disposed on the fixed section. The fixed section includes: a coil substrate having an inner peripheral side wall defiling a circular opening; a flexible printed-circuit board (FPC) disposed at a lower part of the coil substrate, a base that faces the FPC, and a dust generation prevention (Continued)

member that covers at least the inner peripheral side wall and that prevents generation of dust due to the inner peripheral side wall being scraped.

16 Claims, 13 Drawing Sheets

(51) Int. Cl.

| | |
|---|---|
| G03B 5/00 | (2006.01) |
| G03B 3/10 | (2006.01) |
| G02B 7/09 | (2006.01) |
| G02B 13/00 | (2006.01) |
| G02B 27/00 | (2006.01) |
| G03B 13/36 | (2006.01) |
| H04N 5/225 | (2006.01) |

(52) U.S. Cl.
CPC ............ *G02B 27/0006* (2013.01); *G03B 3/10* (2013.01); *G03B 5/00* (2013.01); *G03B 13/36* (2013.01); *H04N 5/2254* (2013.01); *H04N 5/2257* (2013.01); *G03B 2205/0007* (2013.01); *G03B 2205/0069* (2013.01)

(58) Field of Classification Search
USPC .................................................. 359/507, 557
See application file for complete search history.

(56) References Cited

FOREIGN PATENT DOCUMENTS

| | | |
|---|---|---|
| JP | 2013-079998 A | 5/2013 |
| JP | 2013-092578 A | 5/2013 |

* cited by examiner

LENS HOLDER DRIVE DEVICE, CAMERA MODULE, AND PORTABLE TERMINAL PROVIDED WITH CAMERA

TECHNICAL FIELD

The present invention relates to a lens holder driving apparatus, and, more particularly, to a lens holder driving apparatus, a camera module, and a camera-equipped mobile terminal capable of capturing an image without image blurring by correcting camera-shake (vibration) when capturing an image with a miniature camera for a mobile terminal.

BACKGROUND ART

Various kinds of lens holder driving apparatuses have been proposed which are capable of obtaining a sharp image by preventing image blurring on an image forming plane even when camera-shake (vibration) occurs at the time of capturing of an image.

While various kinds of schemes have been proposed as a camera-shake correcting scheme, among these, a "barrel shifting scheme" is known. Here, the "barrel shifting scheme" is a scheme for correcting camera-shake by moving (a lens holder holding) a lens barrel itself housed in an auto-focusing (AF) lens holder driving section (AF unit) in a direction perpendicular to an optical axis direction with respect to a fixed section (base member). A lens holder driving apparatus adopting such a "barrel shifting scheme" includes a lens holder driving apparatus adopting a "moving magnet scheme" in which a permanent magnet moves (is movable) and a lens holder driving apparatus adopting a "moving coil scheme" in which a drive coil moves (is movable).

In the lens holder driving apparatus adopting such a "barrel shifting scheme," a permanent magnet for an AF lens holder driving section is also used as a permanent magnet for a camera-shake correcting section to realize reduction in size and height.

For example, PTL 1 discloses a lens holder driving apparatus adopting a "moving magnet scheme." The lens holder driving apparatus disclosed in PTL 1 has an auto-focusing lens holder driving section (AF unit) which causes a lens holder holding a lens barrel to move along an optical axis, and a camera-shake correcting section which corrects camera-shake by moving the AF unit in a first direction and a second direction with respect to a fixed section, the first direction and the second direction being orthogonal to the optical axis and orthogonal to each other.

In the lens holder driving apparatus disclosed in PTL 1, the AF unit includes a focus coil fixed at the lens holder, a permanent magnet composed of a plurality of permanent magnet pieces having first faces facing the focus coil, a magnet holder holding the permanent magnet, and first and second leaf springs supporting the lens holder so as to make the lens holder displaceable in the optical axis direction. The fixed section is disposed in proximity to the second leaf spring. The camera-shake correcting section has a supporting member supporting the AF unit in such a manner that the AF unit can rock with respect to the fixed section, a camera-shake correction coil (FP coil) composed of a plurality of camera-shake correction coil portions disposed so as to respectively face second faces perpendicular to the first faces of the plurality of permanent magnet pieces, and a plurality of Hall devices.

In the lens holder driving apparatus disclosed in PTL 1, an imaging device disposed on an imaging substrate is mounted at a lower part of the fixed section. The fixed section is configured with a base, a coil substrate having a circular opening and a flexible printed-circuit (FPC) board. The coil substrate is disposed so as to face the permanent magnet with a gap therebetween. The coil substrate is attached to the base across the flexible printed-circuit (FPC) board. The camera-shake correction coil is formed on the coil substrate. Interconnection of the flexible printed-circuit (FPC) board is electrically connected to a plurality of lands of the coil substrate. Therefore, a current is supplied to the camera-shake correction coil via the flexible printed-circuit (FPC) board.

In the lens holder driving apparatus disclosed in PTL 1, the base has a ring-shaped inner wall at a central inner diameter portion thereof. This inner wall of the base covers and hides an inner peripheral side wall which defines the circular opening of the coil substrate, thereby preventing collision between the inner peripheral side wall which defines the circular opening of the coil substrate and the lens barrel, and prevents generation of relatively large dust due to the coil substrate being scraped.

In the lens holder driving apparatus having such a structure, to perform camera-shake correction when an image is captured, the AF unit is driven in a direction which cancels out camera-shake. This drive force can be obtained by making a current flow through the camera-shake correction coil (FP coil) in a magnetic field created by the permanent magnet. Therefore, upon camera-shake correction, a current for pulse-width modulated (PWM) drive necessary for camera-shake correction is made to flow through the camera-shake correction coil (FP coil) and the flexible printed-circuit (FPC) board.

CITATION LIST

Patent Literature

PTL 1
Japanese Patent Application Laid-Open No. 2013-24938

SUMMARY OF INVENTION

Technical Problem

To improve rocking performance (drive force) of the auto-focusing lens holder driving section (AF unit) using the camera-shake correcting section, capacitance of the camera-shake correction coil (FP coil) is increased. As a result, it is necessary to increase an area of the coil substrate. In other words, it is necessary to reduce a diameter of the circular opening of the coil substrate. When the diameter of the circular opening of the coil substrate is made small, there will be no space for the ring-shaped inner wall to be provided in the base. Therefore, the inner peripheral side wall of the coil substrate is exposed.

In the lens holder driving apparatus having such a structure, when high impact such as drop impact of a mobile terminal in which the lens holder driving apparatus is mounted is applied, there is a possibility that the lens barrel moves largely and the lens barrel directly collides with the inner peripheral side wall of the coil substrate. There is concern that this collision generates relatively large dust by the inner peripheral side wall of the coil substrate being scraped.

Because the lens holder driving apparatus is incorporated into a camera module, the dust generated as described above appears in an image captured with the imaging device, which makes the lens holder driving apparatus a defective product.

Therefore, an object of the present invention is to provide a lens holder driving apparatus capable of suppressing a defect due to dust.

Other objects of the present invention will become apparent as the description progresses.

Solution to Problem

To be brief, according to an exemplary aspect of the present invention, a lens holder driving apparatus includes an auto-focusing lens holder driving section including a permanent magnet, the auto-focusing lens holder driving section moving, along an optical axis, a lens holder holding a lens barrel, and a camera-shake correcting section correcting camera-shake by moving the auto-focusing lens holder driving section in a first direction and a second direction with respect to a fixed section, the first direction and the second direction being orthogonal to the optical axis and orthogonal to each other. The camera-shake correcting section includes a supporting member supporting the auto-focusing lens holder driving section so as to allow the auto-focusing lens holder driving section to rock in the first direction and the second direction with respect to the fixed section, and a camera-shake correction coil disposed on the fixed section so as to face the permanent magnet. According to an exemplary aspect of the present invention, the fixed section includes a coil substrate on which the camera-shake correction coil is formed, the coil substrate having an inner peripheral side wall defining a circular opening, a flexible printed-circuit board disposed at a lower part of the coil substrate, a base facing the flexible printed-circuit board, and a dust generation prevention member covering at least the inner peripheral side wall of the coil substrate and preventing generation of dust due to the inner peripheral side wall of the coil substrate being scraped.

Advantageous Effects of Invention

According to the present invention, it is possible to suppress a defect due to dust.

DESCRIPTION OF EMBODIMENTS

Embodiments of the present invention will be described below with reference to the accompanying drawings.

(Embodiment 1)

A lens holder driving apparatus 10 and a camera module 70 provided with the lens holder driving apparatus 10 according to Embodiment 1 of the present invention will be described with reference to FIG. 1 to FIG. 7.

Figure 1:
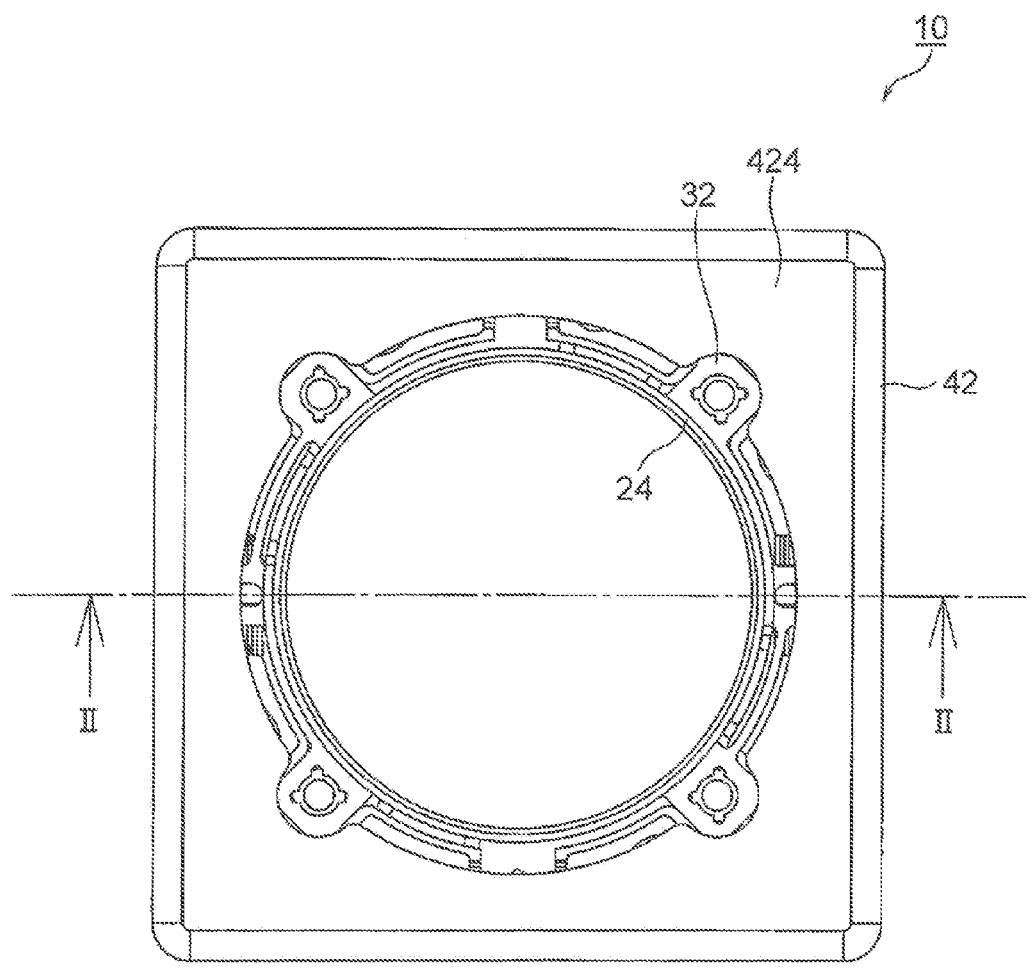
FIG. 1 is a plan view of a lens holder driving apparatus according to Embodiment 1 of the present invention.
Figure 2:
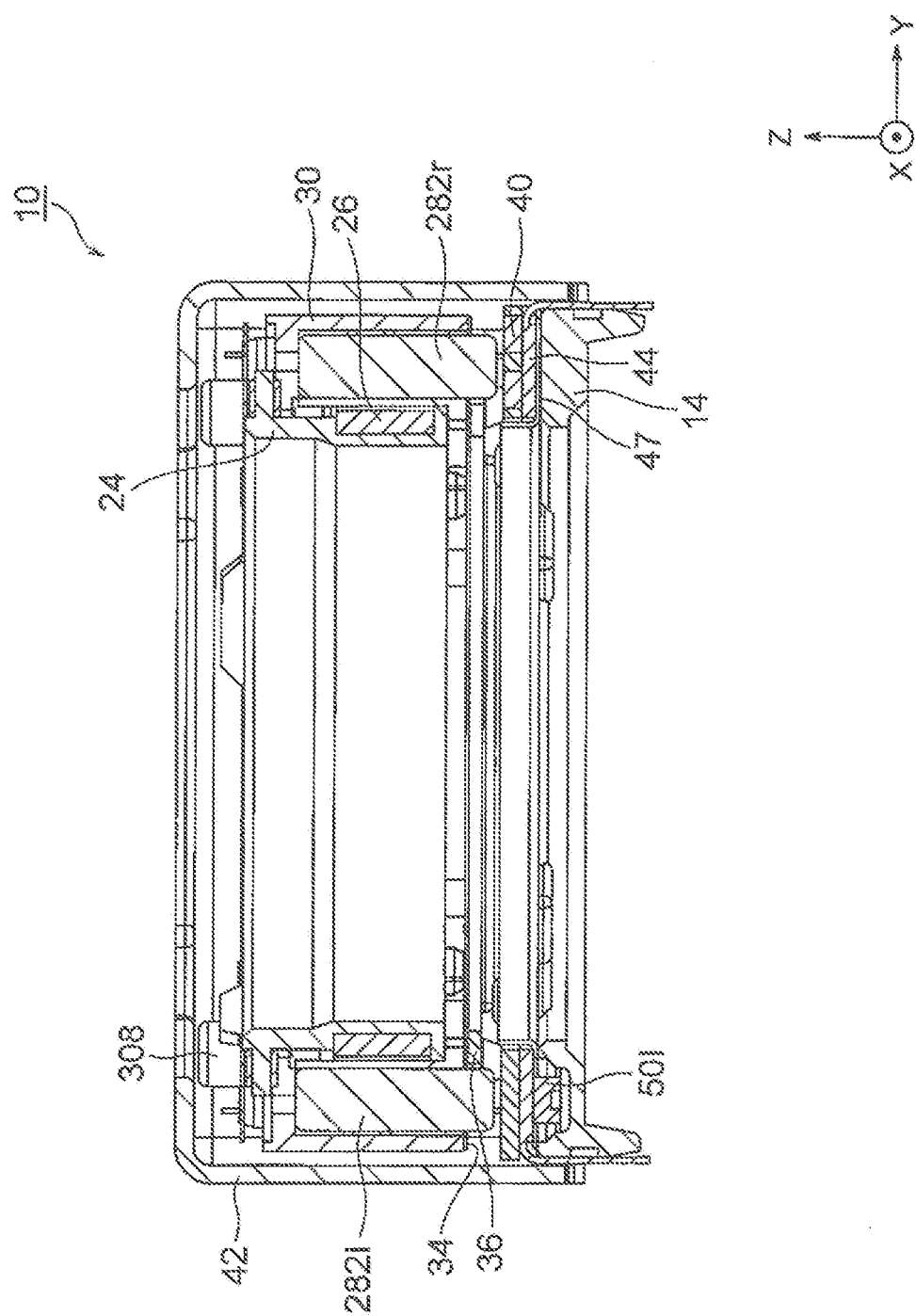
FIG. 2 is a longitudinal cross-section diagram cut along line II-II in FIG. 1.
Figure 3:
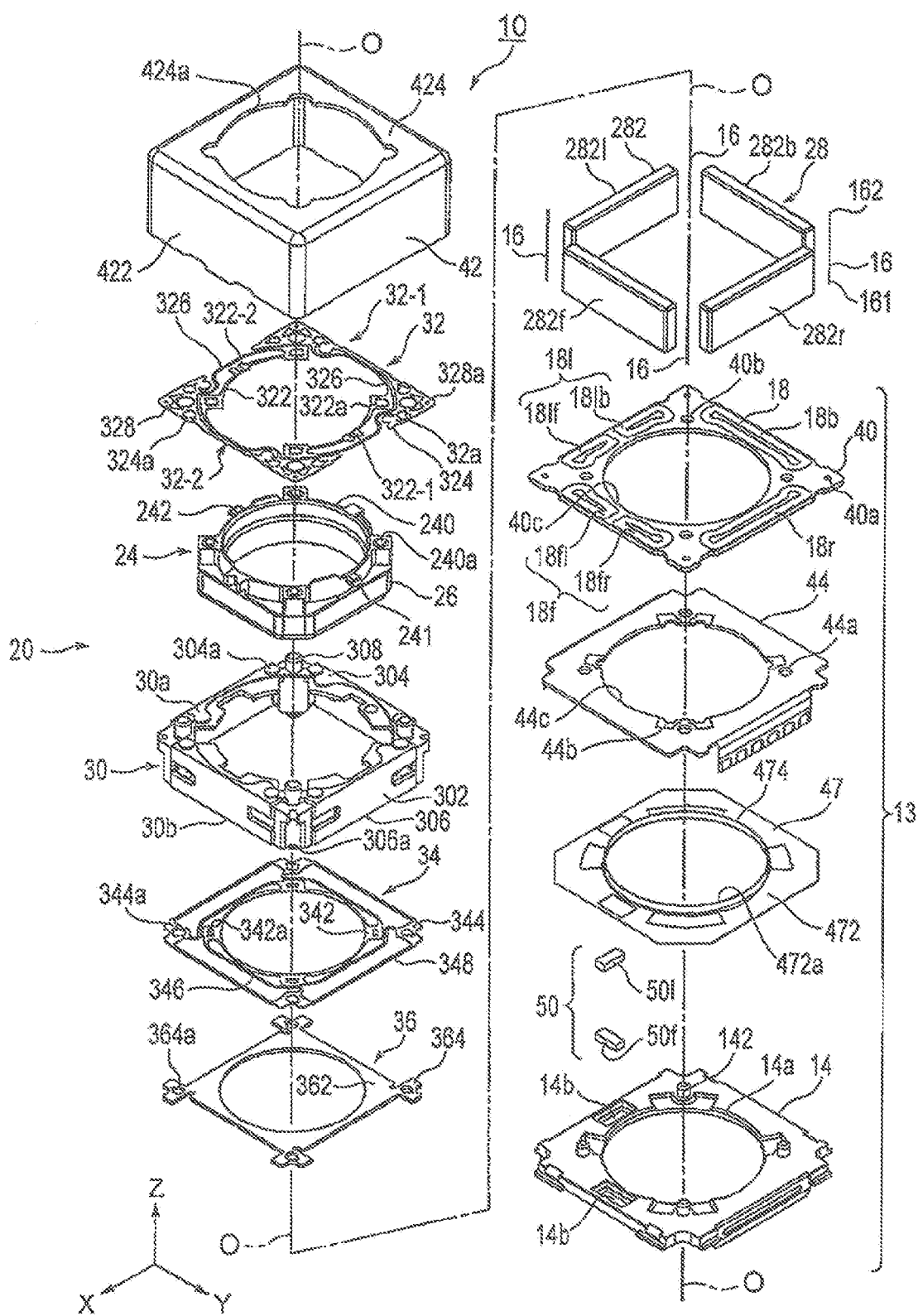
FIG. 3 is an exploded perspective view of the lens holder driving apparatus illustrated in FIG. 1.
Figure 4:
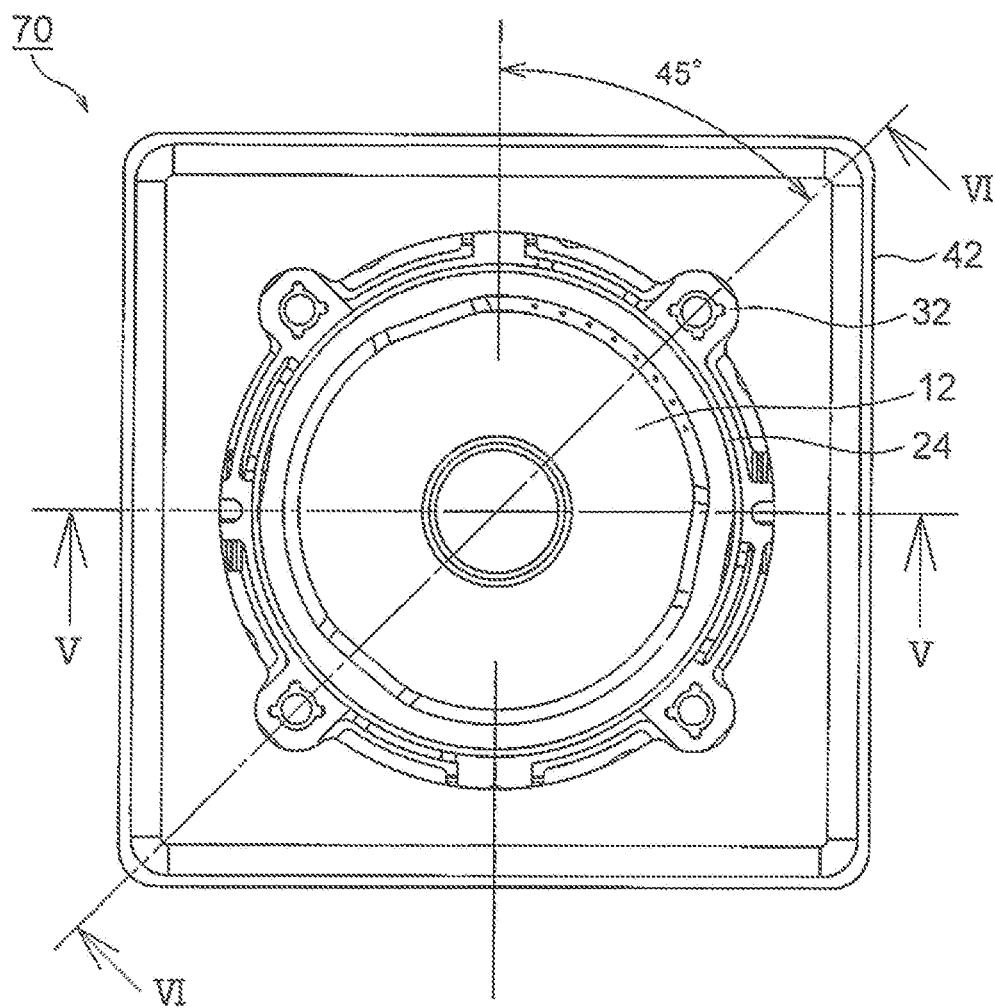
FIG. 4 is a plan view of a camera module equipped with the lens holder driving apparatus illustrated in FIG. 1 to FIG. 3.
Figure 5:
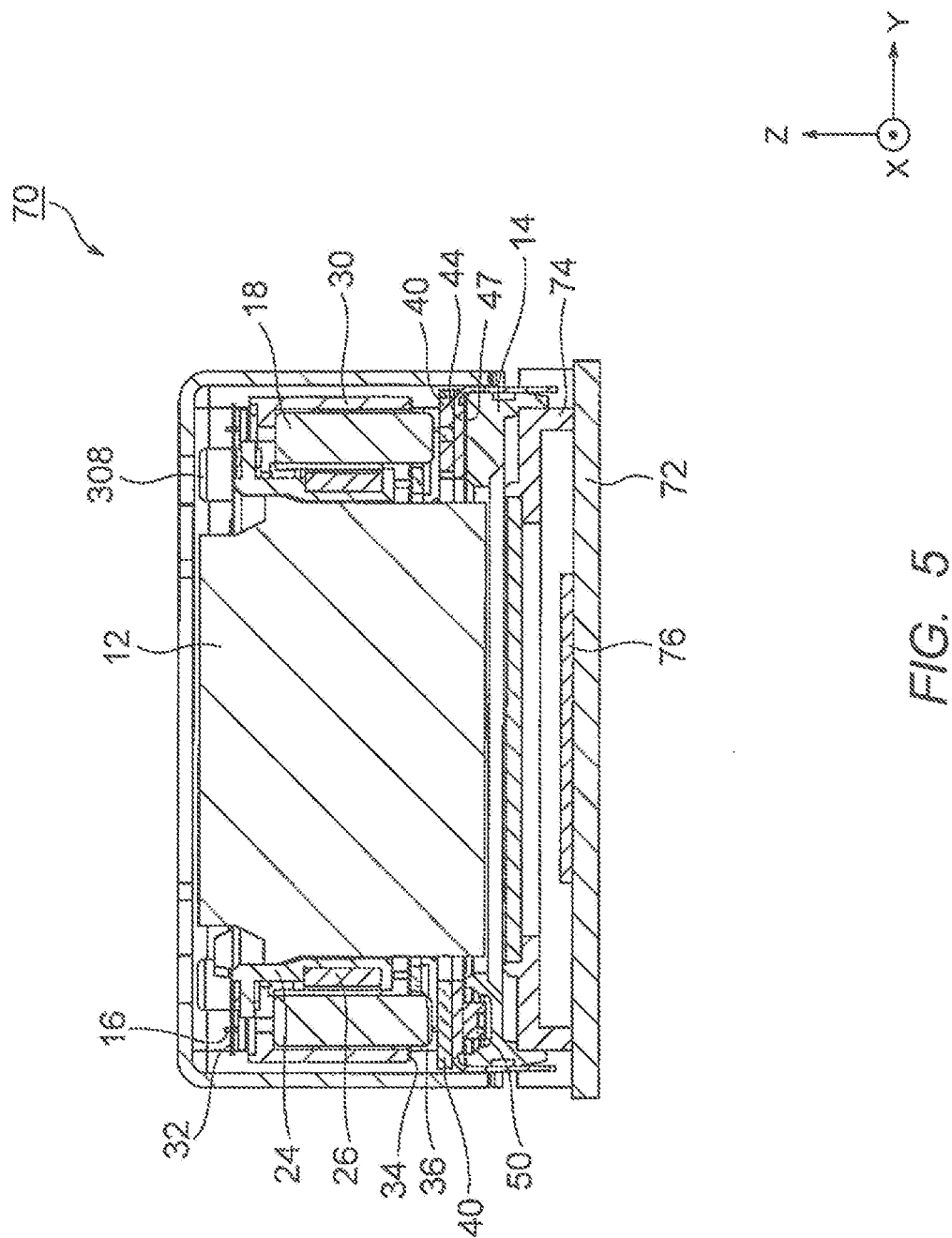
FIG. 5 is a longitudinal cross-section diagram cut along line V-V in FIG. 4.
Figure 6:
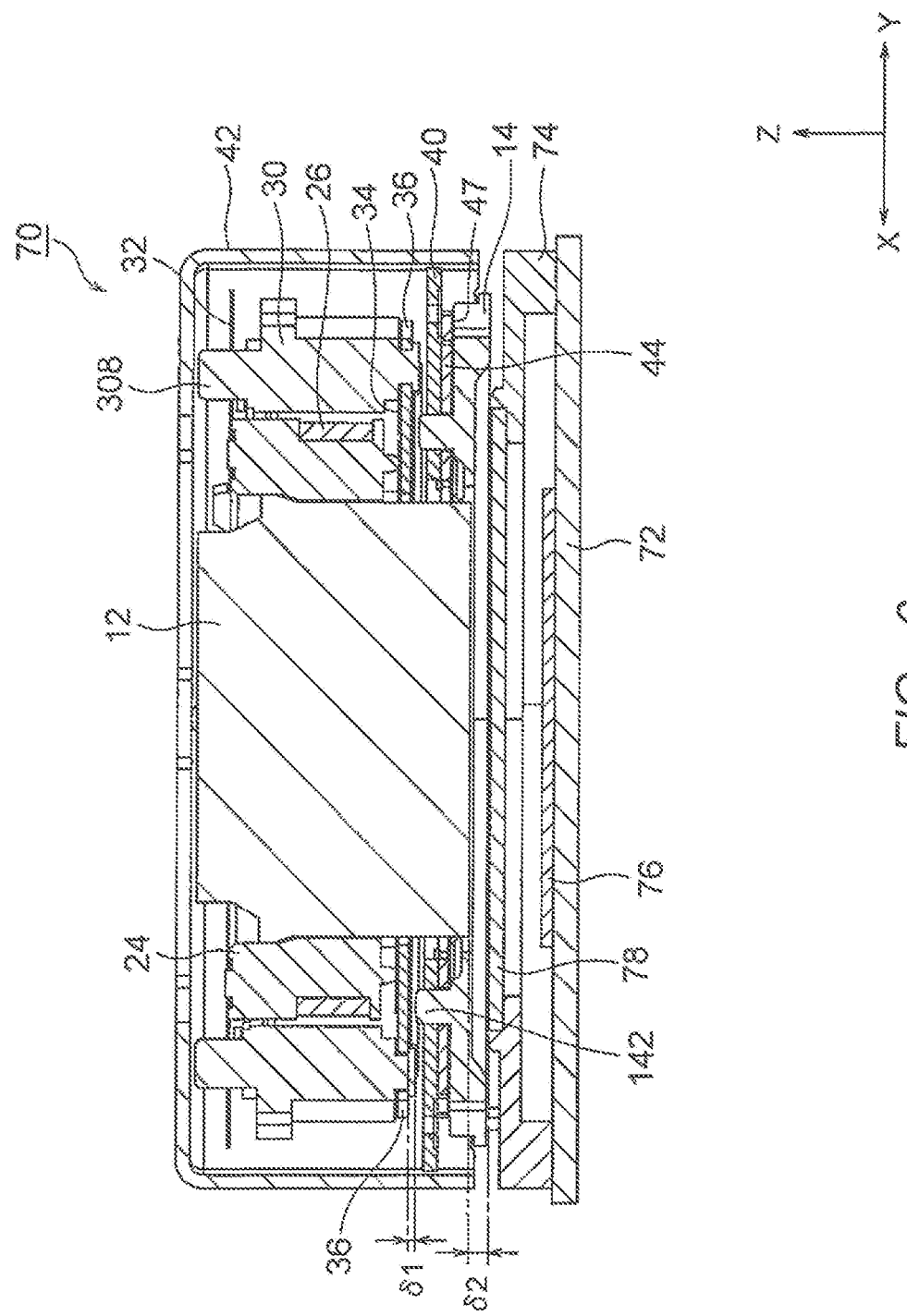
FIG. 6 is a longitudinal cross-section diagram cut along line VI-VI in FIG. 4.
Figure 7:
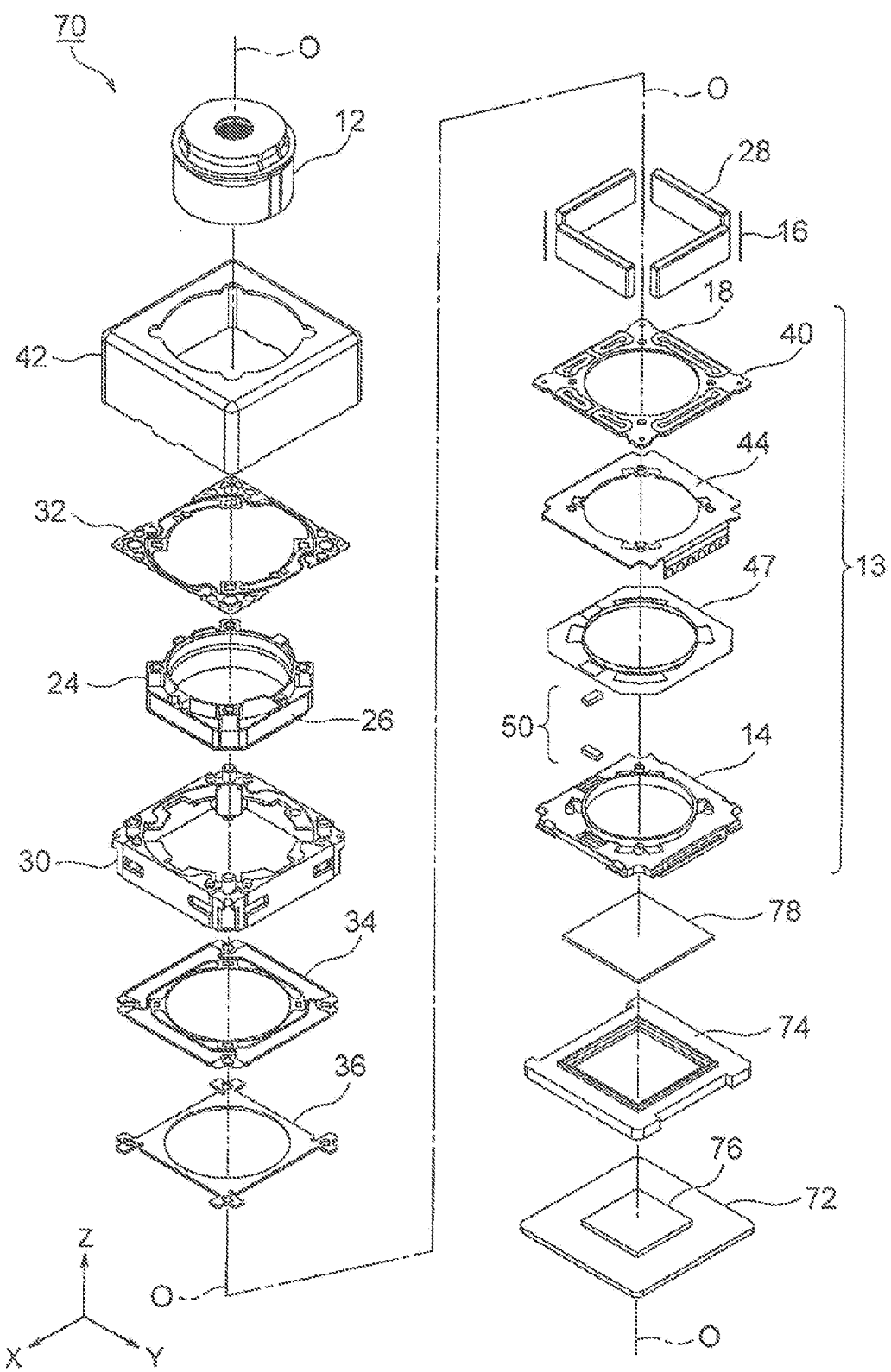
FIG. 7 is an exploded perspective view of the camera module illustrated in FIG. 4.

FIG. 1 is a plan view of the lens holder driving apparatus 10. FIG. 2 is a longitudinal cross-section cut along line II-II in FIG. 1. FIG. 3 is an exploded perspective view of the lens holder driving apparatus 10. FIG. 4 is a plan view of the camera module 70. FIG. 5 is a longitudinal cross-section cut along line V-V in FIG. 4, and FIG. 6 is a longitudinal cross-section cut along line VI-VI in FIG. 4. FIG. 7 is an exploded perspective view of the camera module 70.

Here, as illustrated in FIG. 1 to FIG. 7, orthogonal coordinate system (X, Y, Z) is used. In a state illustrated in FIG. 1 to FIG. 7, in the orthogonal coordinate system (X, Y, Z), the X axis direction is the front-back direction (depth direction), the Y axis direction is the horizontal direction (width direction), and the Z axis direction is the vertical direction (height direction). In the example illustrated in FIG. 1 to FIG. 7, the vertical direction Z is an optical axis O direction of a lens. Note that, in Embodiment 1, the X axis direction (front-back direction) is also referred to as a first direction, and the Y axis direction (horizontal direction) is also referred to as a second direction.

However, in an actual use state, the optical axis O direction, that is, the Z axis direction is the front-back direction. In other words, an upward direction of the Z axis is the front direction, and a downward direction of the Z axis is the back direction.

Figure 9:
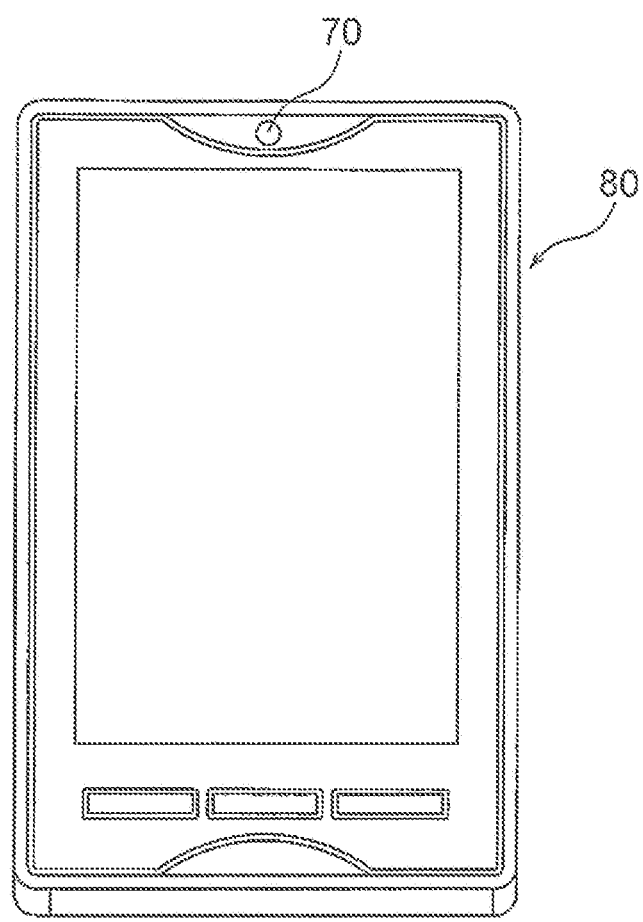
FIG. 9 is a perspective view illustrating a camera-equipped mobile terminal in which the camera module illustrated in FIG. 4 to FIG. 7 is mounted.

Lens holder driving apparatus 10 is provided at a mobile terminal such as a mobile phone equipped with a camera capable of performing auto-focusing, a smartphone, a laptop computer, a tablet personal computer, mobile game machine, a Web camera and an in-vehicle camera as illustrated in FIG. 9 which will be described later.

Lens holder driving apparatus 10 includes auto-focusing lens holder driving section 20 which will be described later, and a camera-shake correcting section (which will be described later) correcting camera-shake (vibration) occurring at auto-focusing lens holder driving section 20 when an image is captured using a miniature camera for a mobile terminal, and can capture an image without image blurring. The camera-shake correcting section of lens holder driving apparatus 10 corrects camera-shake by moving auto-focusing lens holder driving section 20 in a first direction (front-back direction) X and a second direction (horizontal direction) Y with respect to fixed section 13, the first direction and the second direction being orthogonal to the optical axis O and orthogonal to each other.

Auto-focusing lens holder driving section 20 moves lens holder 24 (which will be described later) to which lens barrel 12 can be attached along the optical axis O.

As illustrated in FIG. 3 and FIG. 7, fixed section 13 is disposed away from a bottom part of auto-focusing lens holder driving section 20. At a lower part (back part) of fixed section 13, imaging device (sensor) 76 disposed on imaging substrate (sensor substrate) 72 is mounted. This imaging device (sensor) 76 captures a subject image formed by lens barrel 12 and converts the subject image into an electrical signal. Imaging device (sensor) 76 is configured with, for example, a charge coupled device (CCD) image sensor, a complementary metal oxide semiconductor (CMOS) image sensor, or the like.

Between imaging substrate (sensor substrate) 72 and base 14, holding member (sensor cover) 74 for covering imaging device (sensor) 76 and holding infrared cut filter (IRCF) 78 is provided.

Therefore, camera module 70 includes lens barrel 12, imaging substrate (sensor substrate) 72 on which imaging device (sensor) 76 is mounted, and holding member (sensor cover) 74 in addition to lens holder driving apparatus 10.

As illustrated in FIG. 3, fixed section 13 is configured with base 14, coil substrate 40, flexible printed-circuit (FPC) board 44 and metal cover 47.

Base 14 has a quadrangular external shape and has a ring shape having circular opening 14a inside.

The camera-shake correcting section of lens holder driving apparatus 10 has four suspension wires 16 whose first end portions 161 are fixed at four corner portions of fixed section 13, and as will be described later, camera-shake correction coil 18 disposed so as to face permanent magnet 28 of auto-focusing lens holder driving section 20 which will be described later.

Four suspension wires 16 extend along the optical axis O and support the whole of auto-focusing lens holder driving section 20 in such a manner that auto-focusing lens holder driving section 20 can rock in the first direction (front-back direction) X and the second direction (horizontal direction) Y. Second end portions 162 of four suspension wires 16 are fixed at upper end portions of auto-focusing lens holder driving section 20 as will be described later.

In this manner, four suspension wires 16 function as a supporting member supporting auto-focusing lens holder driving section 20 with respect to fixed section 13 in such a manner that auto-focusing lens holder driving section 20 can rock in the first direction X and the second direction Y As will be described later, the camera-shake correcting section of lens holder driving apparatus 10 includes one quadrangular ring-shaped coil substrate 40 disposed so as to face permanent magnet 28 with a gap therebetween. Coil substrate 40 is attached on base 14 across flexible printed-circuit (FPC) board 44 which will be described later. Camera-shake correction coil 18 is formed on coil substrate 40.

In Embodiment 1, as illustrated in FIG. 3, fixed section 13 includes metal cover 47 inserted between base 14 and flexible printed-circuit (FPC) board 44.

Specifically, as illustrated in FIG. 3, metal cover 47 is composed of plate-like metal plate portion 472 having circular opening 472a, and ring-shaped cylindrical portion 474 projecting upward from an inner wall which defines circular opening 472a of metal plate portion 472.

Metal cover 47 configured as described above is manufactured by a metal plate being subjected to press working and drawing.

Metal plate portion 472 of metal cover 47 is disposed between base 14 and flexible printed-circuit (FPC) board 44.

Cylindrical portion 474 of metal cover 47 covers inner peripheral side wall 40c which defines circular opening 40c of coil substrate 40. Therefore, metal cover 47 functions as a collision prevention member which prevents collision between inner peripheral side wall 40c of coil substrate 40 and lens barrel 12. In other words, metal cover 47 covers at least inner peripheral side wall 40c of coil substrate 40 and acts as a dust generation prevention member which prevents generation of dust due to inner peripheral side wall 40c of coil substrate 40 being scraped.

In the illustrated example, metal cover 47 is formed with nickel silver having a thickness of approximately 50 μm. As is known, nickel silver is a copper—nickel—zinc alloy which is easy to be processed. Note that phosphor bronze may be used as a material of metal cover 47 in place of nickel silver. In either case, any material can be used as the material of metal cover 47 if the material has favorable conductive property.

Illustrated coil substrate 40 is formed with a glass epoxy substrate which is a multilayer substrate.

Lens holder driving apparatus 10 including metal cover 47 having such a structure can prevent collision between inner peripheral side wall 40c of coil substrate 40 and lens barrel 12, and can prevent inner peripheral side wall 40c of coil substrate 40 from being scraped. As a result, it is possible to prevent generation and drop of relatively large dust, thus making it possible to suppress a defect due to dust.

Note that, in the illustrated example, metal cover 47 is connected to the ground. Metal plate portion 472 of metal cover 47 has such a shape that avoids Hall devices 50f and 50l or soldered portions of flexible printed-circuit (FPC) board 44. On the other hand, flexible printed-circuit (FPC) board 44 is provided to supply a current of PWM drive to camera-shake correction coil 18.

Therefore, metal cover 47 also has a function of blocking an electromagnetic wave caused by the current of PWM drive from being radiated downward of flexible printed-circuit (FPC) board 44 (that is, a side of imaging substrate (sensor substrate) 72 on which imaging device (sensor) 76 is mounted).

Note that, metal cover 47 which functions as the collision prevention member, only has to have a structure which enables prevention of collision between inner peripheral side wall 40c of coil substrate 40 and lens barrel 12. Accordingly, while, in the illustrated example, metal cover 47 includes cylindrical portion 474 which covers the whole circumference of inner peripheral side wall 40c of coil substrate 40, metal cover 47 may include, for example, a wall portion having one or more slits so as to avoid collision with lens barrel 12 in place of cylindrical portion 474. Further, while, in the present example, metal cover 47 made from metal is used, a cover made from a material other than metal may be used. Further, while, in the illustrated example, metal cover 47 includes cylindrical portion 474 which covers inner peripheral side wall 40c of coil substrate 40, metal cover 47 may include only cylindrical portion 474 which covers inner peripheral side wall 40c of coil substrate 40.

As described above, fixed section 13 is configured with a combination of base 14, coil substrate 40, flexible printed-circuit (FPC) board 44 and metal cover 47.

Subsequently, auto-focusing lens holder driving section 20 will be described with reference to FIG. 3. Note that auto-focusing lens holder driving section 20 is also referred to as an AF unit.

Auto-focusing lens holder driving section 20 includes lens holder 24 having cylindrical portion 240 for holding lens barrel 12 (FIG. 7), ring-shaped focus coil 26 fixed at lens holder 24 so as to be positioned around cylindrical portion 240, magnet holder 30 holding permanent magnet 28 disposed outside focus coil 26 so as to face focus coil 26, and first and second leaf springs 32 and 34 respectively attached to first and second ends 30a and 30b in an optical axis O direction of magnet holder 30.

First and second leaf springs 32 and 34 support lens holder 24 so as to make lens holder 24 displaceable in the optical axis O direction in a state where lens holder 24 is positioned in a radial direction. In the illustrated example, first leaf spring 32 is referred to as an upper leaf spring, while second leaf spring 34 is referred to as a lower leaf spring.

Further, as described above, in an actual use state, the upward direction of the Z axis direction (optical axis O direction) is the front direction, the downward direction of the Z axis direction (optical axis O direction) is the back direction. Therefore, the upper leaf spring 32 is also referred to as a front spring, while lower leaf spring 34 is also referred to as a back spring.

Magnet holder 30 has a substantially square cylindrical shape. That is, magnet holder 30 has external cylindrical portion 302 having a square cylindrical shape, quadrangular upper ring-shaped end portion 304 provided at upper end (front end, first end) 30a of external cylindrical portion 302, and quadrangular lower ring-shaped end portion 306 provided at lower end (back end, second end) 30b of external cylindrical portion 302. Upper ring-shaped end portion 304 has eight upper projections 304a, two at each corner, projecting upward at four corners. Lower ring-shaped end portion 306 has four lower projections 306a projecting downward at four corners.

Focus coil 26 has a substantially square cylindrical shape which matches an external shape of magnet holder 30 having a square cylindrical shape. Permanent magnet 28 is composed of four rectangular permanent magnet pieces 282 disposed on an inner wall of external cylindrical portion 302 having a square cylindrical shape of magnet holder 30 so as to be away from each other in the first direction (front-back direction) X and the second direction (horizontal direction) Y. These four permanent magnet pieces 282 are disposed at intervals with focus coil 26. In the illustrated embodiment, in each permanent magnet piece 282, an inner peripheral end side is magnetized to the north pole, and an outer peripheral end side is magnetized to the south pole.

Upper leaf spring (front spring) 32 is disposed at an upper side (front side) in the optical axis O direction in lens holder 24, and lower leaf spring (back spring) 34 is disposed at a lower side (back side) in the optical axis O direction in lens holder 24.

Upper leaf spring (front spring) 32 has upper inner peripheral end portion 322 attached to an upper end portion of lens holder 24 as will be described later, and upper outer peripheral end portion 324 attached to upper ring-shaped end portion 304 of magnet holder 30 as will be described later. Between upper inner peripheral end portion 322 and upper outer peripheral end portion 324, a plurality of upper arm portions 326 are provided. That is, the plurality of arm portions 326 connect upper inner peripheral end portion 322 and upper outer peripheral end portion 324.

Cylindrical portion 240 of lens holder 24 has four upper projections 240a projecting upward at four corners at its upper end. Upper inner peripheral end portion 322 has four upper holes 322a to which these four upper projections 240a are respectively inserted. That is, four upper projections 240a of cylindrical portion 240 of lens holder 24 are inserted into four upper holes 322a of upper inner peripheral end portion 322 of upper leaf spring 32 and, then, fixed by a thermoset resin being applied and heated.

On the other hand, upper outer peripheral end portion 324 has eight upper holes 324a to which eight upper projections 304a of magnet holder 30 are respectively inserted. That is, eight upper projections 304a of magnet holder 30 are inserted into eight upper holes 324a of upper outer peripheral end portion 324 and, then, fixed through thermal welding.

Upper leaf spring (front spring) 32 further has four arc-like protruding portions 328 protruding outside in a radial direction at four corners of upper outer peripheral end portion 324. Each of these four arc-like protruding portions 328 has four wire fixation holes 328a to which second end portions 162 of four suspension wires 16 are inserted (engaged).

Lower leaf spring (back spring) 34 has ring-shaped lower inner peripheral end portion 342 attached to a lower end portion of lens holder 24 as will be described later, and four lower outer peripheral end portions 344 provided at four corners and attached to lower ring-shaped end portion 306 of magnet holder 30 as will be described later. Between lower inner peripheral end portion 342 and upper outer peripheral end portion 344, a plurality of lower arm portions 346 are provided. That is, the plurality of lower arm portions 346 connect lower inner peripheral end portion 342 and lower outer peripheral end portions 344. Four lower outer peripheral end portions 344 are coupled to each other with four rod-like connection members 348.

Specific shapes (structures) of arm portions 326 and 346 of leaf springs 32 and 34 will be described next.

Leaf springs 32 and 34 are provided to elastically support lens holder 24. Typically, because a spring constant in the optical axis O direction of a leaf spring greatly affects auto-focusing/stroke characteristics, it is necessary to minimize variation and make the spring constant conform to a design value. Further, because a spring constant of a leaf spring in a direction orthogonal to the optical axis O is an important parameter for determining a high-order resonance frequency of lens holder driving apparatus 10, it is necessary to make the spring constant conform to a design value as with the spring constant in the optical axis O direction.

Here, the spring constant of the leaf spring is determined according to the thickness of the leaf spring, the width of the arm portion, and the length of the arm portion. Because a rolled metal plate is used as a pre-formed material of the leaf spring, actually, the sheet thickness of the leaf spring varies, and, thereby, the spring constant in the optical axis O direction varies. To prevent variation of the spring constant caused by variation of the sheet thickness of the leaf spring, it is necessary to adjust the width of the arm portion of the leaf spring. However, there arises a problem that, even if variation of the spring constant in the optical axis O direction is suppressed by adjusting the width of the arm portion of the leaf spring, the spring constant in the direction orthogonal to the optical axis O changes, and the high-order resonance frequency varies.

Therefore, in the present embodiment, even when the sheet thickness of the leaf spring varies, as will be described later, both the spring constant in the optical axis O direction and the spring constant in the direction orthogonal to the optical axis O direction are made to conform to the design values, and a spring shape for reducing variation of the high-order resonance frequency is employed.

Specifically, the width of arm portions 326 and 346 of leaf springs 32 and 34 is changed separately between at both end portions and at central portions according to the sheet thickness of the leaf springs.

More specifically, it is assumed that the width at the both end portions of arm portions 326 and 346 of leaf springs 32 and 34 is $t_1$, and the width at the central portions is $t_2$. In the present embodiment, by changing width $t_1$ at the both end portions and width $t_2$ at the central portions respectively according to the sheet thickness of leaf springs 32 and 34, it is possible to make the spring constant in the optical axis O direction and the spring constant in the direction orthogonal to the optical axis O conform to the design values at the same time.

While a dimension of width $t_1$ at the both end portions greatly affects the spring constant in the optical axis O direction, a dimension of width $t_2$ at the central portions less affects the spring constant in the optical axis O direction. On the other hand, while the dimension of width $t_1$ at the both end portions relatively less affects the spring constant in the direction orthogonal to the optical axis O, the dimension of width $t_2$ at the central portions greatly affects the spring constant in the direction orthogonal to the optical axis O. In the present embodiment, by setting appropriate dimensions to width $t_1$ at the both end portions and width $t_2$ at the central portions by utilizing this characteristic, the above-mentioned problem is solved.

For example, it is assumed that the sheet thickness of leaf springs 32 and 34 are thicker than the specified (desired) sheet thickness. In this case, to suppress increase of the spring constant in the optical axis O direction, width $t_1$ at the both end portions of arm portions 326 and 346 of leaf springs 32 and 34 is made smaller, while width $t_2$ at the central portions of arm portions 326 and 346 of leaf springs 32 and 34 is made larger to prevent the spring constant in the direction orthogonal to the optical axis O direction from becoming too small ($t_1 < t_2$).

Conversely, it is assumed that the sheet thickness of leaf springs 32 and 34 is thinner than the specified (desired) sheet thickness. In this case, to suppress decrease in the spring constant in the optical axis O direction, width $t_1$ at the both end portions of arm portions 326 and 346 of leaf springs 32 and 34 is made larger, while width $t_2$ at the central portions of arm portions 326 and 346 of leaf springs 32 and 34 is made smaller so as to prevent the spring constant in the direction orthogonal to the optical axis O direction from becoming too large ($t_1 > t_2$).

By employing such a spring shape, even when the sheet thickness of leaf springs 32 and 34 varies, it is possible to make both the spring constant in the optical axis O direction and the spring constant in the direction orthogonal to the optical axis O conform to the design values.

Spacer 36 having substantially the same external shape as lower leaf spring 34 except four rod-like connection members 348 is disposed at a lower portion of lower leaf spring 34. Specifically, spacer 36 has four outer end portions 364 having substantially the same shape as lower outer peripheral end portion 344 of lower leaf spring 34 and provided at four corners and inner ring portion 362 having a shape that covers lower inner peripheral end portion 342 and lower arm portion 346 of lower leaf spring 34.

Cylindrical portion 240 of lens holder 24 has four lower projections (not illustrated) projecting downward at four corners at its lower end. Lower inner peripheral end portion 342 has four lower holes 342a to which these four lower projections are respectively inserted. That is, four lower projections of cylindrical portion 240 of lens holder 24 are respectively inserted into four lower holes 342a of lower inner peripheral end portion 342 of lower leaf spring 34 and, then, fixed through thermal welding.

On the other hand, lower outer peripheral end portion 344 of lower leaf spring 34 has four lower holes 344a to which four lower projections 306a of magnet holder 30 are respectively inserted. Outer end portion 364 of spacer 36 also has four lower holes 364a to which four lower projections 306a of magnet holder 30 are respectively inserted, at positions corresponding to four lower holes 344a. That is, four lower projections 306a of magnet holder 30 are respectively inserted into four lower holes 364a of outer end portion 364 of spacer 36 via four lower holes 344a of lower outer peripheral end portion 344 of lower leaf spring 34 and, then, fixed through thermal welding.

An elastic member formed with upper leaf spring 32 and lower leaf spring 34 functions as guiding means for guiding lens holder 24 so as to be movable only in the optical axis O direction. Each of upper leaf spring 32 and lower leaf spring 34 is formed with beryllium copper, phosphor bronze, stainless steel, or the like.

When lens barrel 12 is mounted on lens holder 24, lens barrel 12 is housed in lens holder 24, and lens barrel 12 and lens holder 24 are bonded with each other using an adhesive.

As will be described later, by making an auto-focusing (AF) current flow through focus coil 26, it is possible to adjust the position of lens holder 24 (lens barrel 12) in the optical axis O direction through interaction between the magnetic field of permanent magnet 28 and a magnetic field created by the AF current flowing through focus coil 26.

As described above, auto-focusing lens holder driving section (AF unit) 20 is configured with lens holder 24, focus coil 26, permanent magnet 28, magnet holder 30, upper leaf spring 32, lower leaf spring 34 and spacer 36.

The camera-shake correcting section of lens holder driving apparatus 10 will be described next in further detail with reference to FIG. 3.

As described above, the camera-shake correcting section of lens holder driving apparatus 10 has four suspension wires 16 whose first end portions 161 are fixed at four corners of fixed section 13, and camera-shake correction coil 18 disposed so as to face permanent magnet 28 of auto-focusing lens holder driving section 20.

Four suspension wires 16 extend along the optical axis O and support the whole of auto-focusing lens holder driving section (AF unit) 20 in such a manner that auto-focusing lens holder driving section 20 can rock in the first direction (front-back direction) X and the second direction (horizontal direction) Y. Second end portions 162 of four suspension wires 16 are fixed at an upper end portion of auto-focusing lens holder driving section 20.

Specifically, as described above, four arc-like protruding portions 328 of upper leaf spring 32 have four wire fixation holes 328a to which second end portions 162 of four suspension wires 16 are respectively inserted (engaged) (see FIG. 3). Second end portions 162 of four suspension wires 16 are inserted (engaged) in these four wire fixation holes 328a and fixed using an adhesive or by soldering, for example.

Note that, while, in the illustrated example, each arc-like protruding portion 328 has an L shape, the shape is, of course, not limited to this.

Two out of four suspension wires 16 are also used to supply power to focus coil 26.

As described above, permanent magnet 28 is composed of four permanent magnet pieces 282 disposed so as to face each other in the first direction (front-back direction) X and the second direction (horizontal direction) Y.

The camera-shake correcting section of lens driving apparatus 10 includes one ring-shaped coil substrate 40 inserted between four permanent magnet pieces 282 and base 14 with a gap therebetween. Coil substrate 40 has through-holes 40*a* at four corners, into which four suspension wires 16 are inserted and which fix first end portions 161. Camera-shake correction coil 18 is formed on this one coil substrate 40.

Here, among four permanent magnet pieces 282, permanent magnet pieces disposed at a front side, a back side, a left side and a right side with respect to the optical axis O will be respectively referred to as front permanent magnet piece 282*f*, back permanent magnet piece 282*b*, left permanent magnet piece 282*l* and right permanent magnet piece 282*r*.

Four camera-shake correction coil portions 18*f*, 18*b*, 18*l* and 18*r* are formed on coil substrate 40 as camera-shake correction coil 18.

Two camera-shake correction coil portions 18*f* and 18*b* disposed so as to face each other in the first direction (front-back direction) X are provided to move (rock) auto-focusing lens holder driving section (AF unit) 20 in the first direction (front-back direction) X. Such two camera-shake correction coil portions 18*f* and 18*b* are collectively referred to as a first direction actuator. Note that, here, camera-shake correction coil portion 18*f* located at the front side with respect to the optical axis O is referred to as a "front camera-shake correction coil portion," while camera-shake correction coil portion 18*b* located at the back side with respect to the optical axis O is referred to as a "back camera-shake correction coil portion."

On the other hand, two camera-shake correction coil portions 18*l* and 18*r* located so as to face each other in the second direction (horizontal direction) Y are provided to move (rock) auto-focusing lens holder driving section (AF unit) 20 in the second direction (horizontal direction) Y. Such two camera-shake correction coil portions 18*l* and 18*r* are collectively referred to as a second direction actuator. Note that, camera-shake correction coil portion 18*l* located at the left side with respect to the optical axis O is referred to as a "left camera-shake correction coil portion," while camera-shake correction coil portion 18*r* located at the right side with respect to the optical axis O is referred to as a "right camera-shake correction coil portion."

In illustrated camera-shake correction coil 18, front camera-shake correction coil portion 18*f* and left camera-shake correction coil portion 18*l* are respectively divided into two coil portions so as to be separated at the center in the longitudinal direction of front permanent magnet piece 282*f* and left permanent magnet piece 282*l* which front camera-shake correction coil portion 18*f* and left camera-shake correction coil portion 18*l* face. That is, front camera-shake correction coil portion 18*f* is configured with left-side coil portion 18*fl* and right-side coil portion 18*fr*. In a similar manner, left camera-shake correction coil portion 18*l* is configured with front-side coil portion 18*lf* and back-side coil portion 18*lb*.

In other words, while each of front camera-shake correction coil portion 18*f* and left camera-shake correction coil portion 18*l* is configured with two loop portions, each of back camera-shake correction coil portion 18*b* and right camera-shake correction coil portion 18*r* is configured with one loop portion.

In this manner, out of four camera-shake correction coil portions 18*f*, 18*b*, 18*l* and 18*r*, specific two camera-shake correction coil portions 18*f* and 18*l* disposed in the first direction X and the second direction Y are respectively divided into two coil portions 18*fl* and 18*fr*, and 18*lf* and 18*lb* so as to be divided at the center in the longitudinal direction of permanent magnet pieces 282*f* and 282*l* which camera-shake correction coil portions 18*f* and 18*l* face.

Four camera-shake correction coil portions 18*f*, 18*b*, 18*l* and 18*r* configured as described above cooperate with permanent magnet 28 to drive the whole auto-focusing lens holder driving section (AF unit) 20 in the X axis direction (first direction) and the Y axis direction (second direction). Further, a combination of camera-shake correction coil portions 18*f*, 18*b*, 18*l* and 18*r* and permanent magnet 28 functions as a voice coil motor (VCM).

In this manner, the illustrated camera-shake correcting section of lens holder driving apparatus 10 corrects camera-shake by moving lens barrel 12 itself housed in auto-focusing lens holder driving section (AF unit) 20 in the first direction (front-back direction) X and the second direction (horizontal direction) Y. Therefore, the camera-shake correcting section of lens holder driving apparatus 10 is referred to as a camera-shake correcting section of a "barrel shifting scheme."

Lens holder driving apparatus 10 further includes shield cover 42 which covers auto-focusing lens holder driving section (AF unit) 20. Shield cover 42 has square cylindrical portion 422 which covers an outer peripheral side face of auto-focusing lens holder driving section (AF unit) 20, and ring-shaped upper end portion 424 which covers an upper face of auto-focusing lens holder driving section (AF unit) 20. Upper end portion 424 has substantially circular opening 424*a* which is coaxial with the optical axis O.

The illustrated camera-shake correcting section of lens holder driving apparatus 10 further includes position detecting section 50 which detects the position of auto-focusing lens holder driving section (AF unit) 20 with respect to base 14 (fixed section 13). Illustrated position detecting section 50 is configured with magnetic position detecting means formed with two Hall devices 50*f* and 50*l* attached on base 14. As will be described later, these two Hall devices 50*f* and 50*l* are respectively disposed so as to face two pieces out of four permanent magnet pieces 282 with a gap therebetween. Each of Hall devices 50*f* and 50*l* is disposed so as to traverse the direction from the north pole to the south pole of permanent magnet piece 282.

In the illustrated example, because one Hall device 50*f* is disposed at a front side in the first direction (front-back direction) X with respect to the optical axis O, Hall device 50*f* is referred to as a front Hall device. Because the other Hall device 50*l* is disposed at a left side in the second direction (horizontal direction) Y with respect to the optical axis O, Hall device 50*l* is referred to as a left Hall device.

Front Hall device 50*f* is disposed on base 14 at a position where front camera-shake correction coil portion 18*f* having two divided coil portions 18*fl* and 18*fr* is divided into two coil portions 18*fl* and 18*fr*. In a similar manner, left Hall device 50*l* is disposed on base 14 at a position where left camera-shake correction coil portion 18*l* having two divided coil portions 18*lf* and 18*lb* is divided into two coil portions 18*lf* and 18*lb*.

In this manner, two Hall devices 50*f* and 50*l* are disposed on base 14 at positions where two specific camera-shake correction coil portions 18*f* and 18*l* respectively having two divided coil portions 18*fl* and 18*fr*, and 18*lf* and 18*lb* are divided into two coil portions 18*fl* and 18*fr*, and 18*lf* and 18*lb*.

Front Hall device 50*f* detects a first position associated with movement (rocking) in the first direction (front-back direction) X by detecting magnetic force of front permanent magnet piece 282f which faces Hall device 50f. Left Hall device 50l detects a second position associated with movement (rocking) in the second direction (horizontal direction) Y by detecting magnetic force of left permanent magnet piece 282l which faces left Hall device 50l.

By the way, in lens holder driving apparatus 10 configured as described above, there is a risk that four suspension wires 16 are fractured by force in a direction that four suspension wires 16 are stretched being applied due to drop impact, or the like. Therefore, lens holder driving apparatus 10 according to the present embodiment includes a fracture prevention member for preventing fracture of four suspension wires 16 as will be described later.

As described above, upper leaf spring 32 has four arc-like protruding portions 328 protruding outward in a radial direction at four corners of upper outer peripheral end portion 324. These four arc-like protruding portions 328 respectively have four wire fixation holes 328a at their tips, to which second end portions 162 of four suspension wires 16 are inserted (engaged). Second end portions 162 of four suspension wires 16 are inserted into these four wire fixation holes 328a, and fixed at four arc-like protruding portions 382 by soldering or using an adhesive.

Therefore, four arc-like protruding portions 328 function as a wire fixation section which fixes second end portions 162 of four suspension wires 16.

In lens holder driving apparatus 10 configured as described above, even when force in a direction that auto-focusing lens holder driving section (AF unit) 20 moves away from base 14 (fixed section 13) is applied to auto-focusing lens holder driving section (AF unit) 20 due to drop impact, or the like, in a state where second end portions 162 of four suspension wires 16 are fixed at four arc-like protruding portions 328 of upper leaf spring 32, auto-focusing lens holder driving section (AF unit) 20 moves upward while four arc-like protruding portions 328 elastically deform.

As a result, it is possible to prevent four suspension wires 16 from being fractured. Therefore, four arc-like protruding portions 328 function as a fracture prevention member which prevents fracture of four suspension wires 16.

On the other hand, magnet holder 30 has four upper stoppers 308 projecting upward at four corners of upper ring-shaped end portion 304. Each upper stopper 308 projects from opening 32a formed between upper outer peripheral end portion 324 of upper leaf spring 32 and each arc-like protruding portion 328.

In other words, four upper stoppers 308 project toward an inner wall face of upper end portion 424 of shield cover 42 from magnet holder 30.

As illustrated in FIG. 2, these four upper stoppers 308 restrict upward movement of auto-focusing lens holder driving section (AF unit) 20. In other words, when auto-focusing lens holder driving section (AF unit) 20 moves upward, while four arc-like protruding portions 328 elastically deform, four upper stoppers 308 of magnet holder 30 abut on the inner wall face of upper end portion 424 of shield cover 42 before four arc-like protruding portions 328 bend and before force that fractures four suspension wires 16 is applied to four suspension wires 16.

That is, four upper stoppers 308 function as a fracture prevention member which assists prevention of fracture of four suspension wires 16.

Note that, as illustrated in FIG. 2, there is little clearance (gap) between fixed section 13 (coil substrate 40) and auto-focusing lens holder driving section (AF unit) 20. Therefore, even when force in a direction that auto-focusing lens holder driving section (AF unit) 20 comes closer to fixed section 13 (coil substrate 40) is applied to auto-focusing lens holder driving section (AF unit) 20 by drop impact, or the like, because auto-focusing lens holder driving section (AF unit) 20 immediately abuts on the upper face of fixed section 13 (coil substrate 40), four suspension wires 16 do not buckle.

Figure 8:
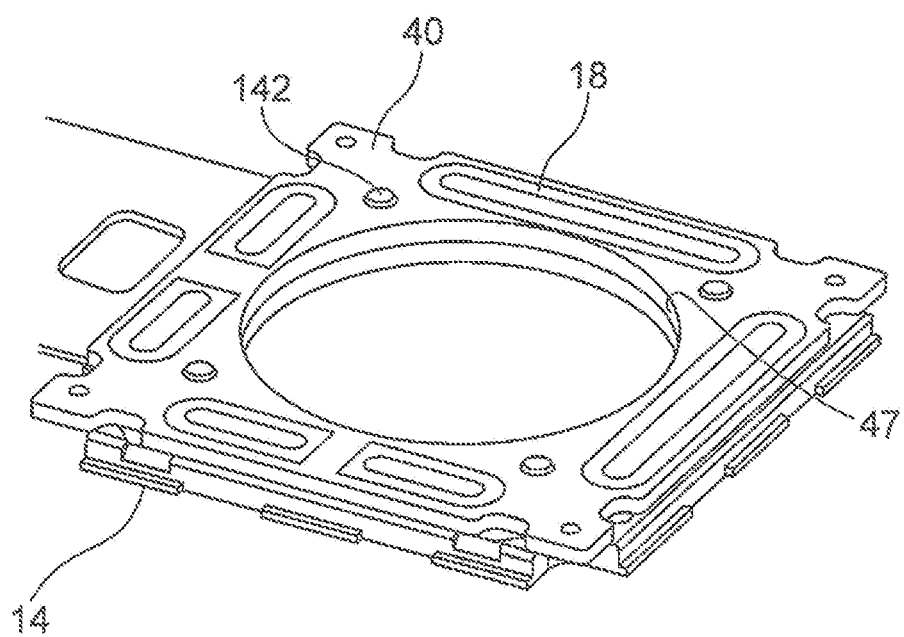
FIG. 8 is a perspective view illustrating a metal cover inserted between a base and a flexible printed-circuit board in the lens holder driving apparatus illustrated in FIG. 1 to FIG. 3.
Figure 8:
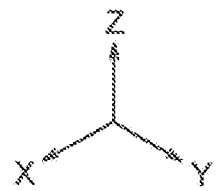

Metal cover 47 and flexible printed-circuit (FPC) board 44 disposed between base 14 and coil substrate 40 and a mounting method thereof will be described next with reference to FIG. 8 in addition to FIG. 3. FIG. 8 is a perspective view illustrating metal cover 47 inserted between base 14 and flexible printed-circuit (FPC) board 44.

As illustrated in FIG. 3, base 14 has four positioning projections 142 projecting upward on diagonals at an external side in a radial direction near circular opening 14a. On the other hand, coil substrate 40 has four positioning hole portions 40b into which these four positioning projections 142 are respectively fitted. Flexible printed-circuit (FPC) board 44 also has four positioning hole portions 44a at positions corresponding to these four positioning hole portions 40b. Therefore, four positioning projections 142 of base 14 are fitted into four positioning hole portions 40b of coil substrate 40 via an opening of metal cover 47 and four positioning hole portions 44a of flexible printed-circuit (FPC) board 44.

Recess portions 14b into which these two Hall devices 50f and 50l are engaged are formed in base 14.

Further, although not illustrated, six lands for supplying currents to four camera-shake correction coil portions 18f, 18b, 18l and 18r are formed along circular opening 40c located at the center of coil substrate 40 on a back side of coil substrate 40. On the other hand, six cutout portions 44b are formed along circular opening 44c at positions respectively corresponding to these six lands on flexible printed-circuit (FPC) board 44. Therefore, by putting solder paste on these six cutout portions 44b and performing reflow soldering, it is possible to electrically connect interconnections (not illustrated) of flexible printed-circuit (FPC) board 44 and six lands of coil substrate 40.

Although not illustrated, a control section is electrically connected to flexible printed-circuit (FPC) board 44. This control section controls a current to flow through focus coil 16 and controls first to fourth IS currents to flow through four camera-shake correction coil portions 18f, 18b, 18l and 18r so as to cancel out rocking detected based on two directional gyro sensors (not illustrated) based on position detection signals detected at two Hall devices 50f and 50l.

A method of supplying power to focus coil 26 will be described next with reference to FIG. 3.

Lens holder 24 has first and second projecting portions 241 and 242 at its upper end, projecting in a direction that first and second projecting portions 241 and 242 move away from each other in the horizontal direction Y (external side in a radial direction). In the illustrated example, because first projecting portion 241 projects toward a right side, first projecting portion 241 is referred to as a right projecting portion, while because second projecting portion 242 projects toward a left side, second projecting portion 242 is referred to as a left projecting portion.

On the other hand, although not illustrated, a wire rod configuring focus coil 26 has first and second distal portions. The first distal portion of focus coil 26 is bound to first projecting portion (right projecting portion) 241 of lens holder 24. Likewise, the second distal portion of the wire rod of focus coil 26 is bound to second projecting portion (left projecting portion) 242 of lens holder 24. Therefore, the first and the second distal portions of focus coil 26 are respectively referred to as first and second bound portion.

On the other hand, first leaf spring (upper leaf spring) 32 is configured with first and second leaf spring pieces 32-1 and 32-2 electrically insulated from each other. First and second leaf spring pieces 32-1 and 32-2 have a shape rotationally symmetric about the optical axis O of the lens. First leaf spring piece 32-1 is disposed practically at a back side and a right side at first end (upper end) 30a of magnet holder 30, and second leaf spring piece 32-2 is disposed practically at a front side and a left side at first end (upper end) 30a of magnet holder 30.

Upper inner peripheral end portion 322 located at the right side of first leaf spring piece 32-1 has first U-shaped terminal portion 322-1 projecting rightward (external side in the radial direction) at a position corresponding to first projecting portion (right projecting portion) 241 of lens holder 24. Likewise, upper inner peripheral end portion 322 located at the left side of second leaf spring piece 32-2 has second U-shaped terminal portion 322-2 projecting leftward (external side in the radial direction) at a position corresponding to second projecting portion (left projecting portion) 242 of lens holder 24. First U-shaped terminal portion 322-1 is also referred to as a right U-shaped terminal portion, while second U-shaped terminal portion 322-2 is also referred to as a left U-shaped terminal portion.

First U-shaped terminal portion (right U-shaped terminal portion) 322-1 is electrically connected to the first distal portion (first bound portion) of focus coil 26 by soldering (not illustrated) at first projecting portion (right projecting portion) 241 of lens holder 24. Likewise, second U-shaped terminal portion (left U-shaped terminal portion) 322-2 is electrically connected to the second distal portion (second bound portion) of focus coil 26 by soldering (not illustrated) at second projecting portion (left projecting portion) 242 of lens holder 24.

Further, as described above, second end portions 162 of two suspension wires 16 (in the example of FIG. 3, right back one and left front one) among four suspension wires 16 are fixed at arc-like protruding portions 328 by soldering (not illustrated) through wire fixation holes 328a. Second end portions 162 of remaining two suspension wires 16 (in the example of FIG. 3, left back one and right front one) are fixed at arc-like protruding portions 328 using an adhesive (not illustrated) through wire fixation holes 328a. Note that second end portions 162 may be fixed by soldering instead of using an adhesive.

Further, as described above, first end portions 161 of two suspension wires 16 (in the example of FIG. 3, right back one and left front one) among four suspension wires 16 are fixed at lands of coil substrate 40 by soldering through through-holes 40a, and are electrically connected to flexible printed-circuit (FPC) board 44. First end portions 161 of remaining two suspension wires 16 (in the example of FIG. 3, left back one and right front one) are fixed at lands of coil substrate 40 by soldering or using an adhesive through through-holes 40a, but not electrically connected to flexible printed-circuit (FPC) board 44.

Therefore, flexible printed-circuit (FPC) board 44 is electrically connected to the first distal portion (first bound portion) of focus coil 26 via one right back suspension wire 16, first leaf spring piece 32-1 of first leaf spring (upper leaf spring) 32 and first U-shaped terminal portion (right U-shaped terminal portion) 322-1. In a similar manner, flexible printed-circuit (FPC) board 44 is electrically connected to the second distal portion (second bound portion) of focus coil 26 via one left front suspension wire 16, second leaf spring piece 32-2 of first leaf spring (upper leaf spring) 32 and second U-shaped terminal portion (left U-shaped terminal portion) 322-2.

In this manner, power is supplied to focus coil 26 from flexible printed-circuit (FPC) board 44 via two suspension wires 16 and first leaf spring 32.

A method of assembling lens holder driving apparatus 10 will be described next.

First, by fitting lens holder 24, focus coil 26, permanent magnet 28, magnet holder 30, upper leaf spring 32, lower leaf spring 34 and spacer 36 together, auto-focusing lens holder driving section (AF unit) 20 is manufactured.

Meanwhile, by reflow soldering described above, an assembly of coil substrate 40 and flexible printed-circuit (FPC) board 44 is manufactured. The assembly is mounted on base 14 provided at a side of first ends 161 of four suspension wires 16 via metal cover 47.

Then, auto-focusing lens holder driving section (AF unit) 20 is mounted on base 14 via the assembly and metal cover 47, second end portions 162 of four suspension wires 16 are fixed at arc-like protruding portions 328 through wire fixation holes 328a by soldering or using an adhesive.

Further, first and second U-shaped terminal portions 322-1 and 322-2 of first leaf spring (upper leaf spring) 32 are respectively connected to the first and the second distal portions (not illustrated) of focus coil 26 by soldering.

Finally, shield cover 42 is disposed so as to cover auto-focusing lens holder driving section (AF unit) 20, and a lower end of shield cover 42 is fixed at base 14.

In this manner, it is possible to easily assemble lens holder driving apparatus 10.

Note that a dimension of lens holder driving apparatus 10 assembled as described above is 9.7 mm×9.7 mm×4.43 mm.

Then, relationship between first gap $\delta 1$ between four positioning projections 142 of base 14 and spacer 36 and second gap $\delta 2$ between infrared cut filter (IRCF) 78 and a bottom of lens barrel 12 will be described with reference to FIG. 6.

Spacer 36 composed of a rigid metal plate is disposed at a lower end side of lens holder 24. Therefore, positions of lens holder 24 and lens barrel 12 in the optical axis O direction are determined by spacer 36.

However, because lens barrel 12 is elastically supported with a pair of leaf springs 32 and 34, when high impact such as impact upon drop of a mobile terminal, which will be described later, is applied, spacer 36 is deformed due to impact applied from lens holder 24 and lens barrel 12. As a result, there is a possibility that lens barrel 12 moves largely and comes into contact with other parts, and the parts may be damaged.

Particularly, because infrared cut filter (IRCF) 78 is provided below lens barrel 12 after lens holder driving apparatus 10 is incorporated into camera module 70, if lens barrel 12 moves largely due to impact, lens barrel 12 may come into contact with infrared cut filter (IRCF) 78 and break infrared cut filter (IRCF) 78.

Therefore, in the present embodiment, second gap $\delta 2$ is made larger than first gap $\delta 1$ ($\delta 2 > \delta 1$). By employing such a structure, even when spacer 36 deforms and lens barrel 12 moves downward upon impact loading, tips of four positioning projections 142 of base 14 and spacer 36 come into contact with infrared cut filter (IRCF) 78 before lens barrel 12 comes into contact with infrared cut filter (IRCF) 78. As a result, it is possible to prevent lens barrel 12 from colliding with infrared cut filter (IRCF) 78.

With lens holder driving apparatus 10 (camera module 70) according to Embodiment 1 of the present invention as described above, it is possible to provide the following advantages.

Because metal cover (collision avoidance member) 47 which prevents collision between inner peripheral side wall 40c of coil substrate 40 and lens barrel 12 is inserted between base 14 and flexible printed-circuit (FPC) board 44, it is possible to prevent inner peripheral side wall 40c of coil substrate 40 from being scraped. As a result, it is possible to prevent generation and drop of relatively large dust, so that it is possible to suppress a defect due to dust.

FIG. 9 is a perspective view illustrating camera-equipped mobile terminal 80 on which camera module 70 is mounted. Illustrated camera-equipped mobile terminal 80 is composed of a smartphone. Camera module 70 is attached at a predetermined position of camera-equipped mobile terminal 80. According to such a structure, a user can capture an image using camera-equipped mobile terminal 80.

Note that, while, in this example, an example has been described in a case where camera-equipped mobile terminal 80 is a smartphone, the camera-equipped mobile terminal may be a camera-equipped mobile phone, a laptop computer, a tablet personal computer, mobile game machine, a Web camera or an in-vehicle camera.

(Embodiment 2)

Lens holder driving apparatus 10A according to Embodiment 2 of the present invention will be described with reference to FIG. 10 to FIG. 12.

Figure 10:
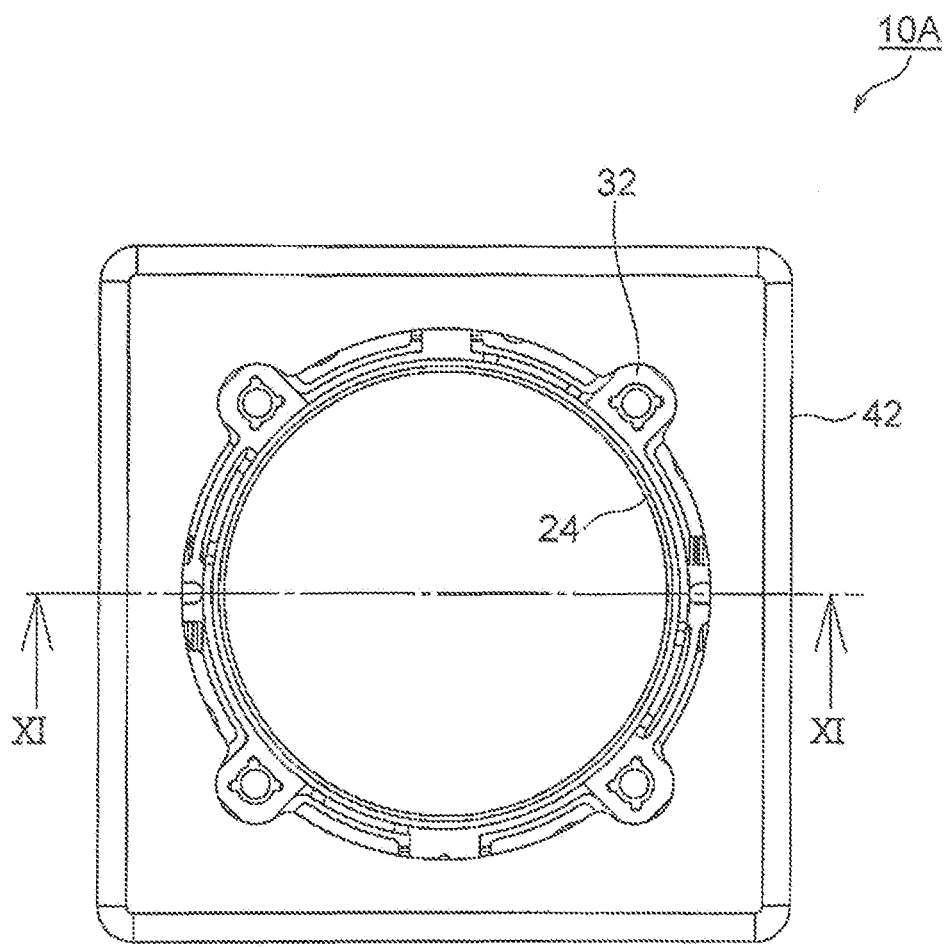
FIG. 10 is a plan view of a lens holder driving apparatus according to Embodiment 2 of the present invention.

FIG. 10 is a plan view of lens holder driving apparatus 10A. FIG. 11 is a longitudinal cross-section diagram cut along line XI-XI in FIG. 10. FIG. 12 is an exploded perspective view of lens holder driving apparatus 10A.

Figure 11:
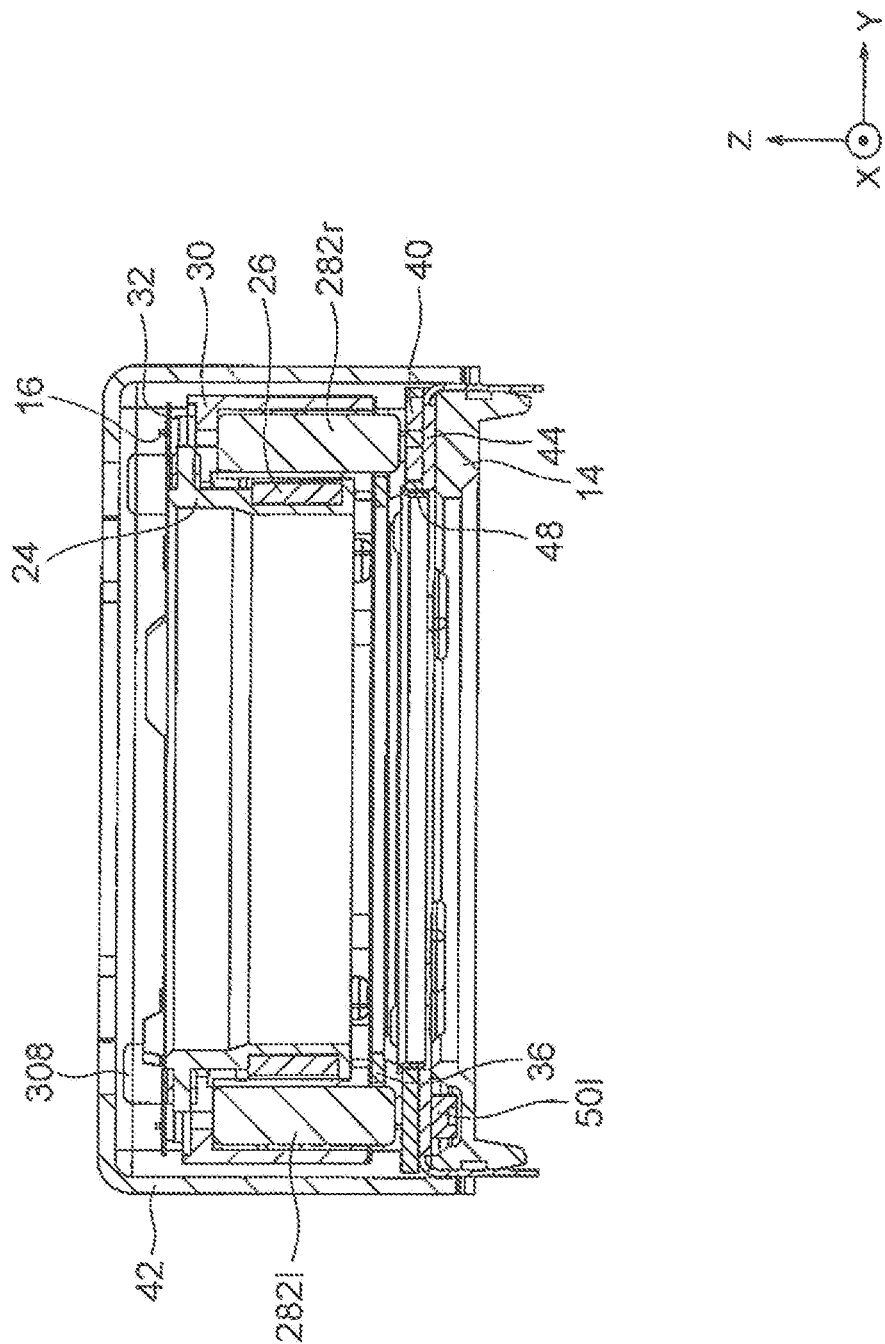
FIG. 11 is a longitudinal cross-section taken cut line XI-XI in FIG. 10.
Figure 12:
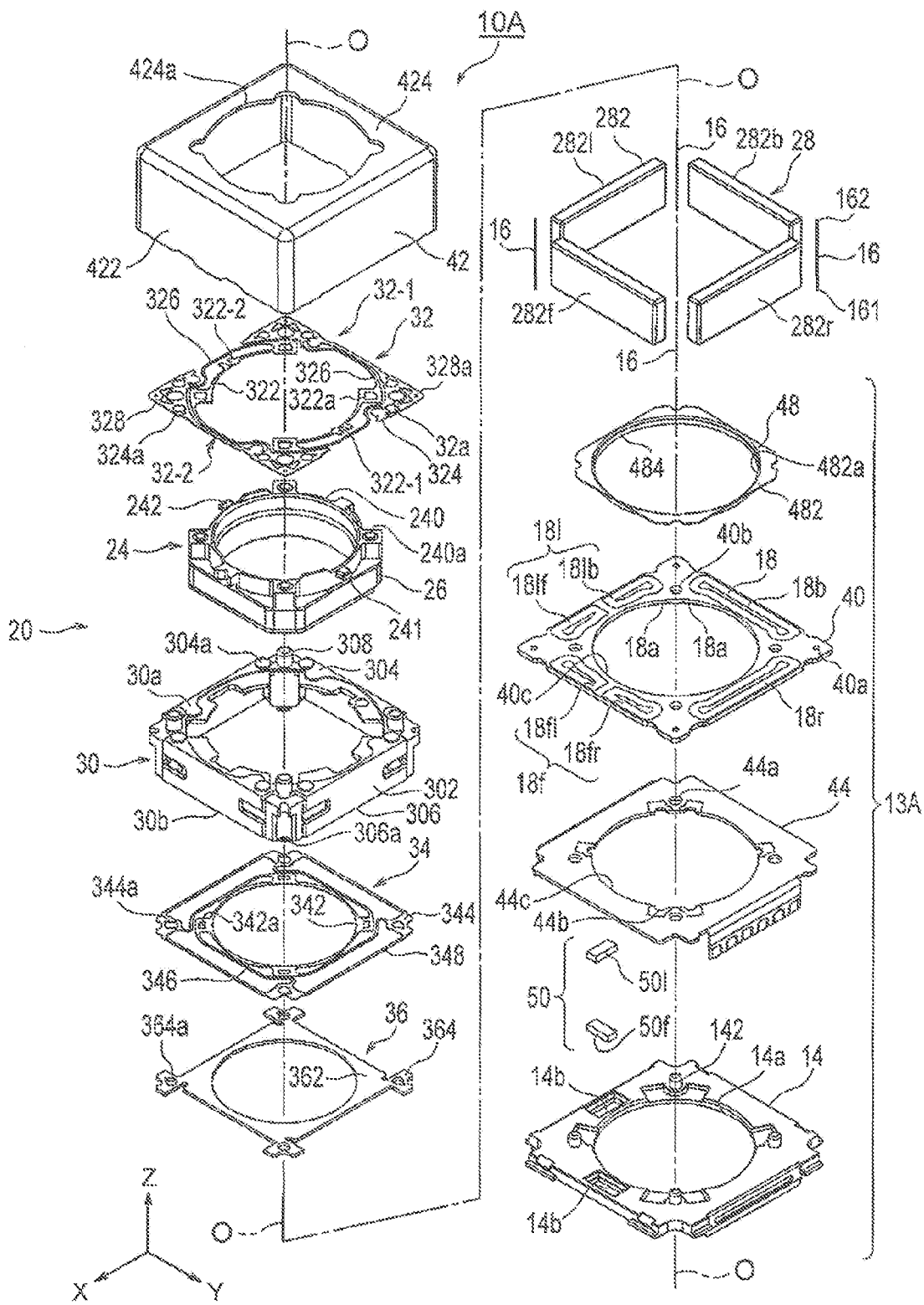
FIG. 12 is an exploded perspective view of the lens holder driving apparatus illustrated in FIG. 10.

Here, as illustrated in FIG. 10 to FIG. 12, orthogonal coordinate system (X, Y, Z) is used. In a state illustrated in FIG. 10 to FIG. 12, in the orthogonal coordinate system (X, Y, Z), the X axis direction is the front-back direction (depth direction), the Y axis direction is the horizontal direction (width direction), and the Z axis direction is the vertical direction (height direction). In the example illustrated in FIG. 10 to FIG. 12, the vertical direction Z is the optical axis O direction of the lens. Note that in Embodiment 2, the X axis direction (front-back direction) is also referred to as a first direction, while the Y axis direction (horizontal direction) is also referred to as a second direction.

However, in an actual use state, the optical axis O direction, that is, the Z axis direction is the front-back direction. In other words, an upward direction of the Z axis is the front direction, and a downward direction of the Z axis is the back direction.

Lens holder driving apparatus 10A is also provided at a mobile terminal such as a mobile phone equipped with a camera capable of performing auto-focusing, a smartphone, a laptop computer, a tablet personal computer, mobile game machine, a Web camera and an in-vehicle camera as illustrated in FIG. 9.

Lens holder driving apparatus 10A includes auto-focusing lens holder driving section 20, and a camera-shake correcting section correcting camera-shake (vibration) occurring at auto-focusing lens holder driving section 20 when an image is captured using a miniature camera for a mobile terminal, and can capture an image without image blurring.

Illustrated lens holder driving apparatus 10A has the same configuration as lens holder driving apparatus 10 illustrated in FIG. 1 to FIG. 3 except that a structure (shape) of the metal cover and a position where the metal cover is disposed are different as will be described later, and operates in a similar manner to lens holder driving apparatus 10. Therefore, reference numeral 13A is assigned to a fixed section. The same reference numerals are assigned to components having the same functions as those of lens holder driving apparatus 10 illustrated in FIG. 1 to FIG. 3, and explanation thereof will be omitted to simplify the description.

The illustrated camera-shake correcting section of lens holder driving apparatus 10A corrects camera-shake by moving auto-focusing lens holder driving section 20 in the first direction (front-back direction) X and the second direction (horizontal direction) with respect to the fixed section 13A, the first direction and the second direction being orthogonal to the optical axis O and orthogonal to each other.

Illustrated fixed section 13A has the same configuration as that of fixed section 13 illustrated in FIG. 3 except that fixed section 13A includes different metal cover 48 in place of metal cover 47.

Metal cover 48 is composed of plate-like metal plate portion 482 having circular opening 482a, and ring-shaped cylindrical portion 484 projecting downward from an inner wall which defines circular opening 482a of metal plate portion 482.

Metal cover 48 configured as described above is manufactured by a metal plate being subjected to press working and drawing.

Figure 13:
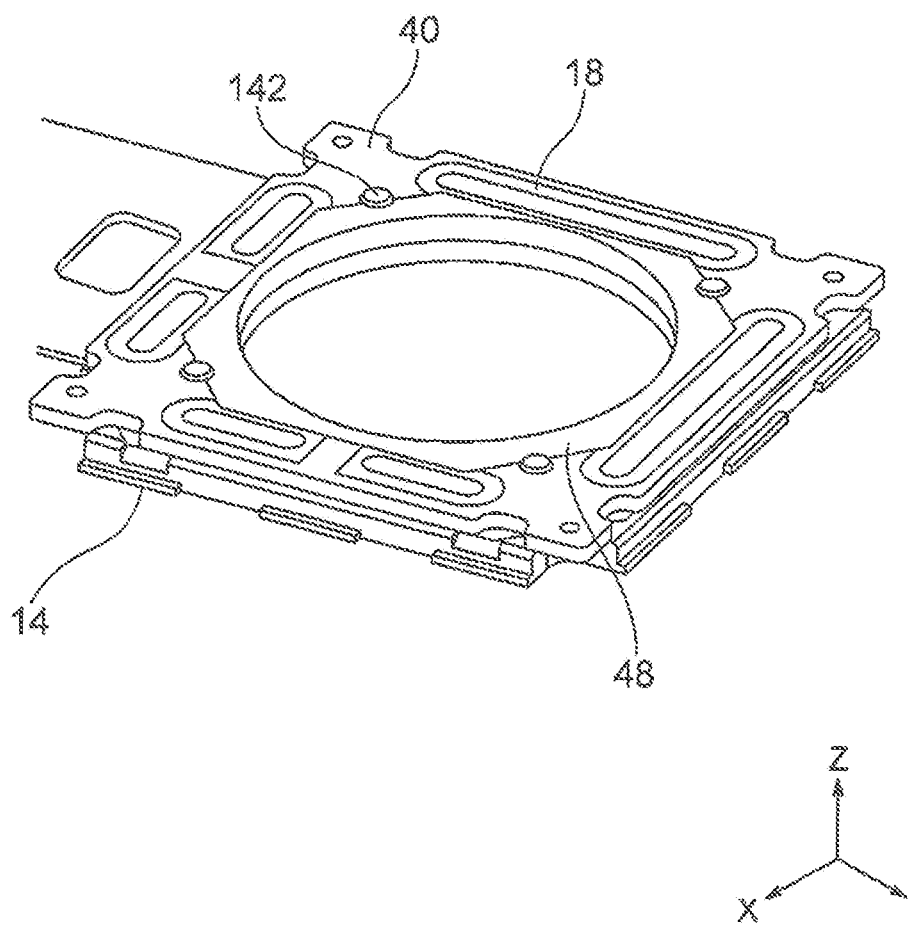
FIG. 13 is a perspective view illustrating a metal cover disposed on a coil substrate in the lens holder driving apparatus illustrated in FIG. 10 to FIG. 12.

As illustrated in FIG. 13, metal plate portion 482 of metal cover 48 is placed (disposed) on an upper face of coil substrate 40. Cylindrical portion 484 of metal cover 48 covers inner peripheral side wall 40c of coil substrate 40.

Therefore, metal cover 48 also functions as a collision prevention member which prevents collision between inner peripheral side wall 40c of coil substrate 40 and lens barrel 12. In other words, metal cover 48 also acts as a dust generation prevention member which covers at least inner peripheral side wall 40c of coil substrate 40 to prevent generation of dust due to inner peripheral side wall 40c of coil substrate 40 being scraped.

In the illustrated example, metal cover 48 is also formed with nickel silver having a thickness of approximately 50 μm. Note that, phosphor bronze may be used as a material of metal cover 48 in place of nickel silver. In either case, any material can be used as the material of metal cover 48 if the material has favorable conductive property.

Lens holder driving apparatus 10A including metal cover 48 configured as described above can prevent collision between inner peripheral side wall 40c of coil substrate 40 and lens barrel 12 and can prevent coil substrate 40 from being scraped in a similar manner to metal cover 47 in Embodiment 1 as described above. As a result, it is possible to prevent generation of relatively large dust, so that it is possible to suppress a defect due to dust.

Note that, metal cover 48 which functions as the collision prevention member only has to employ a structure which can prevent collision between inner peripheral side wall 40c of coil substrate 40 and lens barrel 12. Therefore, while, in the illustrated example, metal cover 48 includes cylindrical portion 484 which covers the whole circumference of inner peripheral side wall 40c of coil substrate 40, metal cover 48 may include, for example, a wall portion having one or more slit which does not collide with lens barrel 12 in place of cylindrical portion 484. Further, while, in the present example, metal cover 48 made from metal is used, a cover made from a material other than metal may be used. Further, while, in the illustrated example, metal cover 48 includes cylindrical portion 484 which covers inner peripheral side wall 40c of coil substrate 40, metal cover 48 may include only cylindrical portion 484 which covers inner peripheral side wall 40c of coil substrate 40.

(Embodiment 3)

A coating material used for a lens holder driving apparatus (camera module) according to Embodiment 3 of the present invention will be described next.

An overall configuration of the lens holder driving apparatus (camera module) according to Embodiment 3 is the same as that of lens holder driving apparatus 10 (camera module 70) according to Embodiment 1 illustrated in FIG. 1 to FIG. 7 except that a configuration of a dust generation prevention member is different, and the lens holder driving apparatus (camera module) according to Embodiment 3 operates in a similar manner to lens holder driving apparatus 10.

The coating material used in Embodiment 3 is provided on inner peripheral side wall 40c of coil substrate 40 in place of metal cover 47. In the illustrated example, the coating material can be obtained by applying a thermoset epoxy resin which is a low-temperature quick curable resin on inner peripheral side wall 40c of coil substrate 40 using a brush and heating and curing the resin in an oven.

The lens holder driving apparatus (camera module) including the coating material having such a structure can prevent inner peripheral side wall 40c of coil substrate from being scraped even if lens barrel 12 collides with inner peripheral side wall 40c of coil substrate 40. As a result it is possible to suppress generation and drop of dust.

Exemplary aspects of the present invention will be described below.

According to a first exemplary aspect of the present invention, a lens holder driving apparatus (10; 10A) includes: an auto-focusing lens holder driving section (20) that moves, along an optical axis (O), a lens holder (24) holding a lens barrel (12), the auto-focusing lens holder driving section (20) including a permanent magnet (28); and a camera-shake correcting section that corrects camera-shake by moving the auto-focusing lens holder driving section (20) in a first direction (X) and a second direction (Y) with respect to a fixed section (13; 13A), the first direction (X) and the second direction (Y) being orthogonal to the optical axis (O) and orthogonal to each other. The camera-shake correcting section includes: a supporting member (16) that supports the auto-focusing lens holder driving section (20) with respect to the fixed section (13; 13A) so as to allow the auto-focusing lens holder driving section (20) to rock in the first direction (X) and the second direction (Y); and a camera-shake correction coil (18) disposed on the fixed section (13; 13A) so as to face the permanent magnet (28). According to the first exemplary aspect of the present invention, the fixed section (13; 13A) includes: a coil substrate (40) on which the camera-shake correction coil (18) is formed, the coil substrate (40) having an inner peripheral side wall (40c) defining a circular opening (40c); a flexible printed-circuit board (44) disposed at a lower part of the coil substrate (40); a base (14) that faces the flexible printed-circuit board (44); and a dust generation prevention member (47; 48) that covers at least the inner peripheral side wall (40c) of the coil substrate (40) and that prevents generation of dust due to the inner peripheral side wall (40c) of the coil substrate (40) being scraped, the dust generation prevention member (47; 48).

In the lens holder driving apparatus (10; 10A) according to the present invention, the dust generation prevention member may be composed of a collision avoidance member (47; 48) preventing collision between the inner peripheral side wall (40c) of the coil substrate (40) and the lens barrel (12). In this case, it is preferable that the collision avoidance member be composed of a ring-shaped cylindrical portion (474; 484) covering the inner peripheral side wall (40c) of the coil substrate (40). Moreover, it is preferable that the collision avoidance member be composed of a metal cover (47) disposed between the flexible printed-circuit board (44) and the base (14), the metal cover (47) including a ring-shaped cylindrical portion (474) covering the inner peripheral side wall (40c) of the coil substrate (40). Alternatively, the collision avoidance member may be composed of a metal cover (48) disposed over an upper face of the coil substrate (40), the metal cover (48) including a ring-shaped cylindrical portion (484) covering the inner peripheral side wall (40c) of the coil substrate (40). The metal cover (47; 48) may be composed of a copper alloy. It is preferable that the copper alloy include a copper-nickel-zinc alloy or phosphor bronze.

In the lens holder driving apparatus (10; 10A) according to the present invention, the dust generation prevention member may be composed of a coating material provided at the inner peripheral side wall (40c) of the coil substrate (40). The coating material may be obtained by applying a thermoset epoxy resin on the inner peripheral side wall (40c) of the coil substrate (40) and heating and curing the thermoset epoxy resin.

In the lens holder driving apparatus (10; 10A) according to the present invention, the auto-focusing lens holder driving section (20) may include: a focus coil (26) fixed at the lens holder (24); a magnet holder (30) disposed at an outer periphery of the lens holder (24), the magnet holder (30) holding the permanent magnet (28) and including first and second ends (30a, 30b) facing each other in a direction of the optical axis (O); and first and second leaf springs (32, 34) respectively attached to the first and the second ends (30a, 30b) of the magnet holder (30), the first and the second leaf springs (32, 34) supporting the lens holder (24) so as to make the lens holder (24) displaceable in the direction of the optical axis (O) while the lens holder (24) is positioned in a radial direction, for example. In this case, it is preferable that the permanent magnet (28) be composed of a plurality of permanent magnet pieces (282f, 282b, 282l, 282r) respectively having first faces facing the focus coil (26), the plurality of permanent magnet pieces (282f, 282b, 282l, 282r) being disposed so as to face each other in the first direction (X) and the second direction (Y) at an external side in a radial direction of the focus coil (26) with respect to the optical axis (O), and that the camera-shake correction coil (18) be composed of a plurality of camera-shake correction coil portions (18f, 18b, 18l, 18r) respectively facing second faces perpendicular to the first faces of the plurality of permanent magnet pieces, the plurality of camera-shake correction coil portions (18f, 18b, 18l, 18r) being disposed on the fixed section (13; 13A).

In addition, in the lens holder driving apparatus (10; 10A) according to the present invention, the supporting member may be composed of a plurality of suspension wires (16) whose first end portions (161) are fixed at an outer peripheral portion of the fixed section (13; 13A). In this case, the plurality of suspension wires (16) extend along the optical axis (O) and support the auto-focusing lens holder driving section (20) with respect to the fixed section (13; 13A) so as to allow the auto-focusing lens holder driving section (20) to rock in the first direction (X) and the second direction (Y). It is preferable that second end portions (162) of the plurality of suspension wires (16) be fixed at the first leaf spring (32).

According to a second exemplary aspect of the present invention, a camera module (70) is obtained, the camera module (70) including: the lens holder driving apparatus (10; 10A); the lens barrel (12) held at the lens holder (24); and an imaging device (76) that captures a subject image formed by the lens barrel (12).

According to a third exemplary aspect of the present invention, a camera-equipped mobile terminal (80) including the camera module (70) mounted therein is obtained.

Note that reference numerals in brackets are assigned to facilitate understanding of the present invention by way of merely one example, and the present invention is, of course, not limited to these.

While the present invention has been described above with reference to the embodiments, the present invention is not limited to the above-described embodiments. Various modifications which can be understood by a person skilled in the art can be made to the configuration or details of the present invention within the scope of the present invention.

For example, while, in the above-described embodiments, a plurality of suspension wires whose first end portions are fixed at outer peripheral portions of the fixed section are used as a supporting member which supports the auto-focusing lens holder driving section with respect to the fixed section in such a manner that auto-focusing lens holder driving section can rock, the supporting member is not limited to this. Further, the present invention can be not only applied to lens holder driving apparatuses 10 and 10A according to the above-described embodiments, but also can be applied to a lens holder driving apparatus adopting a "moving magnet scheme" including an auto-focusing lens holder driving section (AF unit) including a permanent magnet.

REFERENCE SIGNS LIST 10, 10A Lens holder driving apparatus
12 Lens barrel
13, 13A Fixed section
14 Base
14a Circular opening
14b Recess portion
142 Positioning projection
16 Suspension wire
161 First end portion
162 Second end portion
18 Camera-shake correction coil
18f Front camera-shake correction coil portion
18fl Left-side coil portion
18fr Right-side coil portion
18b Back camera-shake correction coil portion
18l Left camera-shake correction coil portion
18lf Front-side coil portion
18lb Back-side coil portion
18r Right camera-shake correction coil portion
20 Auto-focusing lens holder driving section (AF unit)
24 Lens holder
240 Cylindrical portion
240a Upper projection
241 First projecting portion
242 Second projecting portion
26 Focus coil
28 Permanent magnet
282 Permanent magnet piece
282f Front permanent magnet piece
282b Back permanent magnet piece
282l Left permanent magnet piece
282r Right permanent magnet piece
30 Magnet holder
30a First end
30b Second end
302 External cylindrical portion
304 Upper ring-shaped end portion
304a Upper projection
306 Lower ring-shaped end portion
306a Lower projection
308 Stopper (fracture prevention assisting member)
32 First leaf spring (upper leaf spring)
32-1 First leaf spring piece
32-2 Second leaf spring piece
32a Opening
322 Upper inner peripheral end portion
322a Upper hole
322-1 First U-shaped terminal portion
322-2 Second U-shaped terminal portion
324 Upper outer peripheral end portion
324a Upper hole
326 Upper arm portion
328 Arc-like protruding portion (fracture prevention member, wire fixation section)
328a Wire fixation hole
34 Second leaf spring (lower leaf spring)
342 Lower inner peripheral end portion
342a Lower hole
344 Lower outer peripheral end portion
344a Lower hole
346 Lower arm portion
348 Connection member
36 Spacer
362 Inner ring portion
364 Outer end portion
364a Lower hole
40 Coil substrate
40a Through-hole
40b Positioning hole portion
40c Circular opening (inner peripheral side wall)
42 Shield cover
422 Square cylindrical portion
424 Upper end portion
424a Circular opening
44 Flexible printed-circuit (FPC) board
44a Positioning hole portion
44b Cutout portion
44c Circular opening
47 Metal cover (collision avoidance member)
472 Metal plate portion
472a Circular opening
474 Cylindrical portion
48 Metal cover (collision avoidance member)
482 Metal plate portion
482a Circular opening
484 Cylindrical portion
50 Position detecting section
50f Front Hall device
50l Left Hall device
70 Camera module
72 Imaging substrate (sensor substrate)
74 Holding member (sensor cover)
76 Imaging device (sensor)
78 Infrared cut filter (IRCF)
80 Camera-equipped mobile terminal (smartphone)
O Optical axis
X First direction (front-back direction)
Y Second direction (horizontal direction)

The invention claimed is:

1. A lens holder driving apparatus comprising:
an auto-focusing lens holder driving section that moves, along an optical axis (O), a lens holder holding a lens barrel, the auto-focusing lens holder driving section including a permanent magnet; and
a camera-shake correcting section that corrects camera-shake by moving the auto-focusing lens holder driving section in a first direction (X) and a second direction (Y) with respect to a fixed section, the first direction (X) and the second direction (Y) being orthogonal to the optical axis (O) and orthogonal to each other,
wherein the camera-shake correcting section comprises:
a supporting member that supports the auto-focusing lens holder driving section (20) with respect to the fixed section to allow the auto-focusing lens holder driving section (20) to rock in the first direction (X) and the second direction (Y), and
a camera-shake correction coil disposed on the fixed section to face the permanent magnet; and
the fixed section comprises:
a coil substrate on which the camera-shake correction coil is formed, the coil substrate having an inner peripheral side wall defining a circular opening,
a flexible printed-circuit board disposed at a lower part of the coil substrate,
a base that faces the flexible printed-circuit board, and
a dust generation prevention member that covers at least the inner peripheral side wall of the coil substrate and that prevents generation of dust due to the inner peripheral side wall of the coil substrate being scraped, the dust generation prevention member being a member different from the base.

2. The lens holder driving apparatus according to claim 1, wherein:
the dust generation prevention member is composed of a collision avoidance member preventing collision between the inner peripheral side wall of the coil substrate and the lens barrel.

3. The lens holder driving apparatus according to claim 2, wherein:
the collision avoidance member is composed of a ring-shaped cylindrical portion covering the inner peripheral side wall of the coil substrate.

4. The lens holder driving apparatus according to claim 2, wherein:
the collision avoidance member is composed of a metal cover disposed between the flexible printed-circuit board and the base, the metal cover including a ring-shaped cylindrical portion covering the inner peripheral side wall of the coil substrate.

5. The lens holder driving apparatus according to claim 2, wherein:
the collision avoidance member is composed of a metal cover disposed over an upper face of the coil substrate, the metal cover including a ring-shaped cylindrical portion covering the inner peripheral side wall of the coil substrate.

6. The lens holder driving apparatus according to claim 4, wherein:
the metal cover is composed of a copper alloy.

7. The lens holder driving apparatus according to claim 6, wherein:
the copper alloy comprises a copper-nickel-zinc alloy or phosphor bronze.

8. The lens holder driving apparatus according to claim 5, wherein:
the metal cover is composed of a copper alloy.

9. The lens holder driving apparatus according to claim 8, wherein:
the copper alloy comprises a copper—nickel—zinc alloy or phosphor bronze.

10. The lens holder driving apparatus according to claim 1, wherein:
the dust generation prevention member is composed of a coating material provided at the inner peripheral side wall of the coil substrate.

11. The lens holder driving apparatus according to claim 10, wherein:
the coating material is obtained by applying a thermoset epoxy resin on the inner peripheral side wall of the coil substrate and heating and curing the thermoset epoxy resin.

12. The lens holder driving apparatus according to claim 1, wherein:
the auto-focusing lens holder driving section comprises:
a focus coil fixed at the lens holder;
a magnet holder disposed at an outer periphery of the lens holder, the magnet holder holding the permanent magnet and including first and second ends facing each other in a direction of the optical axis (O); and
first and second leaf springs respectively attached to the first and the second ends of the magnet holder, the first and the second leaf springs supporting the lens holder to make the lens holder displaceable in the direction of the optical axis (O) while the lens holder is positioned in a radial direction,
the permanent magnet is composed of a plurality of permanent magnet pieces respectively having first faces facing the focus coil, the plurality of permanent magnet pieces being disposed to face each other in the first direction (X) and the second direction (Y) at an external side in a radial direction of the focus coil with respect to the optical axis (O), and
the camera-shake correction coil is composed of a plurality of camera-shake correction coil portions respectively facing second faces perpendicular to the first faces of the plurality of permanent magnet pieces, the plurality of camera-shake correction coil portions being disposed on the fixed section.

13. The lens holder driving apparatus according to claim 12, wherein:
the supporting member is composed of a plurality of suspension wires whose first end portions are fixed at an outer peripheral portion of the fixed section, the plurality of suspension wires extending along the optical axis (O) and supporting the auto-focusing lens holder driving section with respect to the fixed section to allow the auto-focusing lens holder driving section to rock in the first direction (X) and the second direction (Y).

14. The lens holder driving apparatus according to claim 13, wherein:
second end portions of the plurality of suspension wires are fixed at the first leaf spring.

15. A camera module comprising:
the lens holder driving apparatus according to claim 1;
the lens barrel held at the lens holder; and
an imaging device that captures a subject image formed by the lens barrel.

16. A camera-equipped mobile terminal comprising the camera module according to claim 15 mounted therein.

* * * * *